US012282364B2

(12) United States Patent
Shah et al.

(10) Patent No.: US 12,282,364 B2
(45) Date of Patent: Apr. 22, 2025

(54) POSTURE PROBABILITIES FOR HINGED TOUCH DISPLAY

(71) Applicant: Microsoft Technology Licensing, LLC, Redmond, WA (US)

(72) Inventors: Chirag Shah, San Jose, CA (US); Stefan Angelevski, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 17/141,027

(22) Filed: Jan. 4, 2021

(65) Prior Publication Data

US 2022/0214725 A1 Jul. 7, 2022

(51) Int. Cl.
*G06F 3/0346* (2013.01)
*G06F 1/16* (2006.01)
*G06F 3/0488* (2022.01)

(52) U.S. Cl.
CPC .......... *G06F 1/1694* (2013.01); *G06F 3/0346* (2013.01); *G06F 3/0488* (2013.01)

(58) Field of Classification Search
CPC ..... G06F 1/1694; G06F 3/0346; G06F 3/0488
See application file for complete search history.

(56) References Cited

U.S. PATENT DOCUMENTS

| | | | |
|---|---|---|---|
| 5,896,126 A | 4/1999 | Shieh | |
| 8,760,426 B1 | 6/2014 | Strand | |
| 8,803,816 B2 | 8/2014 | Kilpatrick et al. | |
| 9,128,660 B2 | 9/2015 | Kretz | |
| 9,632,606 B1* | 4/2017 | Olson | G06F 3/0418 |
| 10,254,870 B2 | 4/2019 | Chawda et al. | |
| 10,591,974 B2 | 3/2020 | Da Veiga et al. | |
| 2003/0029919 A1* | 2/2003 | Lynggaard | G06V 10/17 235/472.03 |
| 2009/0244031 A1 | 10/2009 | Westerman et al. | |
| 2010/0079405 A1 | 4/2010 | Bernstein et al. | |
| 2010/0088633 A1 | 4/2010 | Sakurada | |
| 2010/0182265 A1 | 7/2010 | Kim et al. | |
| 2010/0302212 A1 | 12/2010 | Weber et al. | |

(Continued)

OTHER PUBLICATIONS

"Device Class Definition for Human Interface Devices (HID) Version 1.11", Retrieved From: http://www.rennes.supelec.fr/ren/fi/elec/docs/usb/hid1_11.pdf, Jun. 27, 2001, 98 Pages.

(Continued)

*Primary Examiner* — Haoshian Shih
(74) *Attorney, Agent, or Firm* — Alleman Hall & Tuttle LLP

(57) ABSTRACT

A computing device includes a hinge rotatably coupling a first leaf including a touch display and a second leaf. A hinge angle sensor measures a hinge angle between the first leaf and the second leaf. An inertial measurement unit measures an orientation of one or both of the leaves. A first touch heat map is received from the touch display. Based on the touch heat map, hinge angle, and orientation, a posture probability is generated indicating a likelihood that the first touch display is in a candidate display posture, and an active probability is generated indicating a likelihood that the first touch display is an active display. One or more display characteristics of the first touch display are adjusted based on the posture probability and the active probability.

20 Claims, 14 Drawing Sheets

(56) References Cited

U.S. PATENT DOCUMENTS

| | | | |
|---|---|---|---|
| 2011/0128248 | A1 | 6/2011 | Nakata et al. |
| 2012/0032979 | A1 | 2/2012 | Blow et al. |
| 2012/0262407 | A1 | 10/2012 | Hinckley et al. |
| 2012/0297348 | A1 | 11/2012 | Santoro |
| 2013/0002565 | A1 | 1/2013 | Tumanov et al. |
| 2013/0132903 | A1 | 5/2013 | Krishnaswamy et al. |
| 2013/0176270 | A1 | 7/2013 | Cattivelli et al. |
| 2013/0241840 | A1 | 9/2013 | Durojaiye |
| 2014/0085260 | A1 | 3/2014 | Guarneri et al. |
| 2014/0262127 | A1* | 9/2014 | Barnes ................. H04M 1/725 165/11.1 |
| 2014/0368470 | A1 | 12/2014 | Bastani |
| 2015/0022558 | A1 | 1/2015 | Li |
| 2015/0048846 | A1 | 2/2015 | Post et al. |
| 2015/0177870 | A1 | 6/2015 | Nicholson et al. |
| 2015/0261375 | A1 | 9/2015 | Leigh et al. |
| 2015/0301647 | A1 | 10/2015 | Sato et al. |
| 2015/0332107 | A1 | 11/2015 | Paniaras |
| 2015/0363585 | A1* | 12/2015 | Gooding ............... H04L 67/303 726/19 |
| 2016/0162061 | A1 | 6/2016 | Worfolk |
| 2016/0209944 | A1 | 7/2016 | Shim et al. |
| 2016/0334867 | A1* | 11/2016 | Yanai .................... G06F 3/0446 |
| 2016/0371046 | A1* | 12/2016 | Komiyama ........... G06F 1/1649 |
| 2017/0177203 | A1 | 6/2017 | Davidov et al. |
| 2017/0193261 | A1 | 7/2017 | Schwartz et al. |
| 2018/0088786 | A1 | 3/2018 | Abzarian et al. |
| 2018/0181245 | A1* | 6/2018 | Beck .................... G06F 3/04883 |
| 2018/0356904 | A1* | 12/2018 | Disano ................. G06F 3/0488 |
| 2019/0041922 | A1* | 2/2019 | Kurma Raju ......... G06F 1/1637 |
| 2019/0371225 | A1* | 12/2019 | Aurongzeb ........... G06F 3/1423 |
| 2020/0110493 | A1* | 4/2020 | Ron ...................... G06F 3/0412 |

OTHER PUBLICATIONS

Larson, et al. "HeatWave: Thermal Imaging for Surface User Interaction", in Proceedings of the SIGCHI Conference on Human Factors in Computing Systems, May 7, 2011, pp. 2565-2574.

"HID Over I2C Protocol Specification Version 1.0", Retrieved From: https://docs.microsoft.com/en-us/previous-versions/windows/hardware/design/dn642101(v=vs.85), Jun. 1, 2017, 01 Page.

"HID Usage Tables Version 1.12", Retrieved From: https://www.usb.org/sites/default/files/documents/hut1_12v2.pdf, Oct. 28, 2004, 168 Pages.

"How Can App Analytics Help You?", Retrieved From: http://web.archive.org/web/20150221033110/http://appanalytics.io/, Feb. 21, 2015, 06 Pages.

Yin, Yang, "Real-time Continuous Gesture Recognition for Natural Multimodal Interaction", in Thesis of Massachusetts Institute of Technology, Jun. 2014, 152 Pages.

"Final Office Action Issued in U.S. Appl. No. 15/660,679", Mailed Date: Dec. 2, 2019, 42 Pages.

"Non Final Office Action Issued in U.S. Appl. No. 15/660,679", Mailed Date: Apr. 2, 2020, 41 Pages.

"Non-Final Office Action Issued in U.S. Appl. No. 15/660,679", Mailed Date: Jul. 1, 2019, 50 Pages.

"Final Office Action Issued in U.S. Appl. No. 15/901,710", Mailed Date: Apr. 9, 2020, 46 Pages.

"Non Final Office Action Issued in U.S. Appl. No. 15/901,710", Mailed Date: Oct. 30, 2019, 38 Pages.

Abdelrahman, et al., "Investigation of Material Properties for Thermal Imaging-Based Interaction", in Proceedings of the 33rd Annual ACM Conference on Human Factors in Computing Systems, Apr. 18, 2015, pp. 15-18.

Buschel, et al., "Foldable3D: Interacting with 3D Content Using Dual-Display Devices", in Proceedings of the ACM International Conference on Interactive Surfaces and Spaces, Nov. 6, 2016, pp. 367-372.

Cichon, et al., "Gesture Tracking and Recognition in Touchscreens Usability Testing", in Proceedings of the International Conference on Multimedia, Interaction, Design and Innovation, Jun. 24, 2013, 8 Pages.

Khalilbeigi, et al., "FoldMe: Interacting with Double-sided Foldable Displays", in the Proceedings of 6th International Conference on Tangible, Embedded and embodied Interaction, Feb. 19, 2012, pp. 33-40.

Lettner, et al., "Heat Maps as a Usability Tool for Multi-Touch Interaction in Mobile Applications", in Proceedings of the 11th International Conference on Mobile and Ubiquitous Multimedia, Dec. 4, 2012, 2 pages.

Schaefers, et al., "Beyond Heat Maps-Mining Common Swipe Gestures", in Proceedings of the 12th International Conference on Mobile and Ubiquitous Multimedia, Dec. 2, 2013, 4 Pages.

Vatavu, et al., "Gesture Heatmaps: Understanding Gesture Performance with Colorful Visualizations", in Proceedings of 16th International Conference on Multimodal Interaction, Nov. 12, 2014, pp. 172-179.

Wilson, Tracy V., "How the iPhone Works", Retrieved from: https://web.archive.org/web/20090414052307/http://electronics.howstuffworks.com/iphone.htm/printable, Apr. 14, 2009, 16 Pages.

"International Search Report and Written Opinion Issued in PCT Application No. PCT/US21/058691", Mailed Date: Mar. 7, 2022, 14 Pages.

* cited by examiner

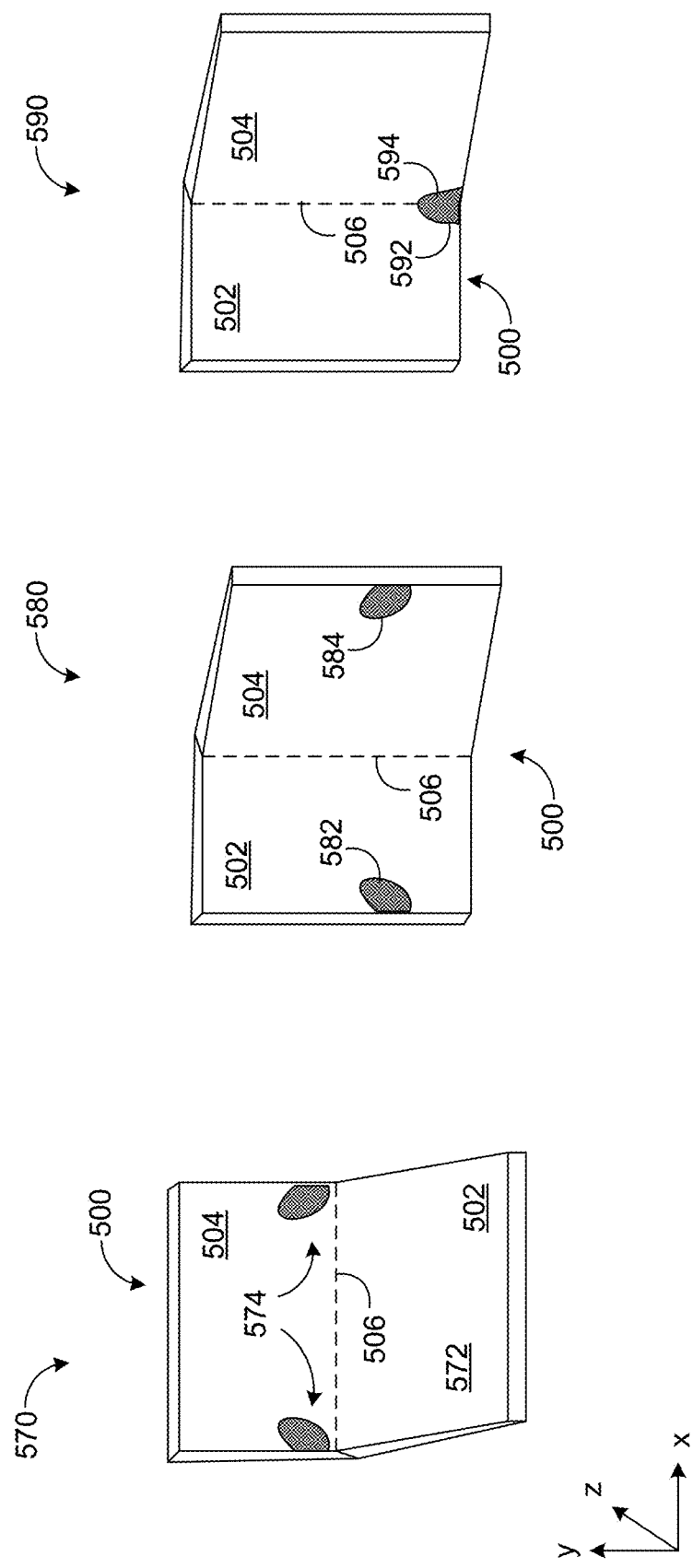

POSTURE PROBABILITIES FOR HINGED TOUCH DISPLAY

BACKGROUND

Computing devices may couple a pair of touch-sensitive displays around a hinge. This configuration allows for myriad display poses and postures. A user may use the device as a single, flat-panel display, a partially-folded book-style device, or fully folded with a displays facing in opposite directions. Each display may be oriented in landscape or portrait mode individually or as a pair, allowing for customized display options for different applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device includes a hinge rotatably coupling a first leaf including a touch display and a second leaf. A hinge angle sensor measures a hinge angle between the first leaf and the second leaf. An inertial measurement unit measures an orientation of one or both of the leaves. A first touch heat map is received from the touch display. Based on the touch heat map, hinge angle, and orientation, a posture probability is generated indicating a likelihood that the first touch display is in a candidate display posture, and an active probability is generated indicating a likelihood that the first touch display is an active display. One or more display characteristics of the first touch display are adjusted based on the posture probability and the active probability.

BRIEF DESCRIPTION OF THE DRAWINGS

FIGS. 5A-5C schematically illustrate heat maps for a user holding a computing device in a variety of postures.

DETAILED DESCRIPTION

Figure 1A:
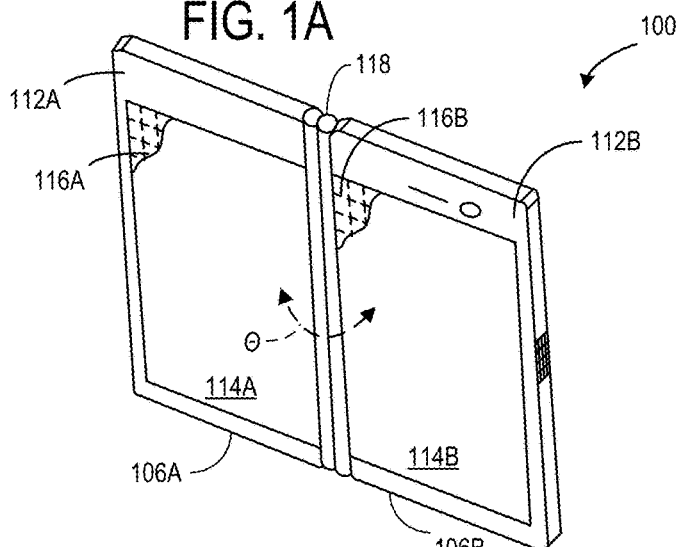
FIG. 1A shows an example computing device with dual displays in a flat configuration with a hinge angle of 180°.

Foldable computing devices may include a pair of leaves rotatably coupled around a hinge. This allows for the device to adopt numerous conformations, enabling the user to select from a plurality of options as to how the device is employed. Each leaf may include a portion of the computing device, such as a display screen, touch display screen, keyboard, trackpad, and/or other display componentry, processing componentry, communication componentry, and/or input componentry.

When each of the two leaves include a display, the two displays may combine to form a single, larger touch display. The device may be partially folded into a pose resembling a book or tent. The device may be completely folded into a compact pose where only one display is active. Even if one of the two displays is not presenting content, the touch sensors for the inactive display may remain active, allowing for additional user inputs and controls.

The computing device may thus behave differently in different postures. However, this functionality depends on the computing device being able to discern which pose or posture the device is in, effectively mimicking the ability to discern the user's intent for how the device is to be used. The device may have to determine whether each of the screens are activated, the orientation of the display (or combined display), and how to configure inputs and display objects to match the device posture. Depending on which sensors are being used to determine posture, there may be some ambiguity as to how the user presently wants to deploy the computing device. The user's preference may vary across applications.

To address these issues, as shown in FIGS. 1A-E, a computing device 100 in accordance with one example embodiment of the present disclosure is disclosed. The computing device 100 comprises a first leaf 106A and a second leaf 106B. In this example, first leaf 106A includes a first touch display 112A having first display surface 114A, and a first capacitive touch sensor 116A. Second leaf 106B comprises a second touch display 112B having a second display surface 114B and a second capacitive touch sensor 116B. The first and second touch displays 112A, 112B are rotatably coupled via a hinge 118, that may be positioned at various hinge angles θ, allowing for relative rotational movement of first touch display 112A and second touch display 112B. The first touch display 112A and the second touch display 112B are separated by the hinge angle. The hinge angle is defined as an angle between the first display surface 114A and the second display surface 114B. In the illustrated example, the hinge 118 is rotatable such that the hinge angle may have any value between 0° and 360°.

Although this disclosure is primarily described in the context of hinged computing devices having two rotatably coupled touch displays, many of the systems and methods presented herein are equally applicable to hinged computing devices having rotatably coupled leaves where one of the leaves is a touch display and the second leaf is a non-touch display, a keyboard, a trackpad, or other suitable component for displaying information, receiving user input, or otherwise interacting with the first leaf and/or providing other computing functionality. Each pair of leaves may include two identical sub-devices or may be asymmetric. When two similar sub-devices are included (e.g., two touch displays), the internal hardware may be divided asymmetrically, e.g., so as to avoid redundancy.

The respective display surfaces 114A, 114B are configured to display images, which may be formed independently of one another or in combination as a combined logical display, as will be described in detail below. While the first and second capacitive touch sensors 116A, 116B are illustrated in a capacitive grid configuration, it will be appreciated that other types of touch sensors and configurations may also be used, such as, for example, a capacitive diamond configuration. The capacitive touch sensors are typically at least partially transparent, being manufactured, for example, of indium tin oxide (ITO). The first and second capacitive touch sensors 116A, 116B are configured to detect a touch input caused by a change in capacitance between driven electrodes and read electrodes in the grid resulting from objects on or near the touch displays 112A, 112B, such as a user's finger, hand, stylus, etc. Touch sensing technologies that do not utilize capacitance are also compatible with this disclosure.

Figure 1B:
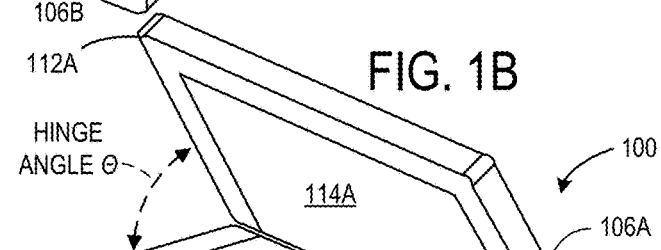
FIG. 1B shows the computing device of FIG. 1 in a folded pose with a hinge angle of 45°.
Figure 1C:
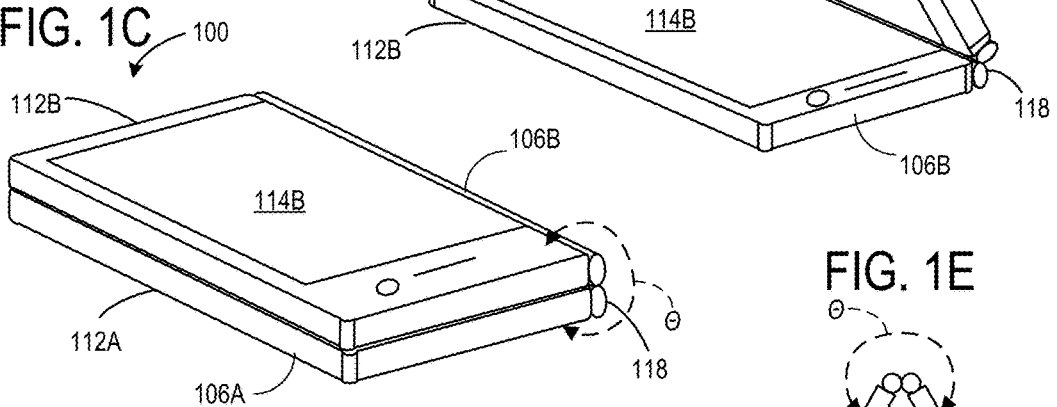
FIG. 1C shows the computing device of FIG. 1 in a back-to-back pose with a hinge angle of 360°.
Figure 1E:
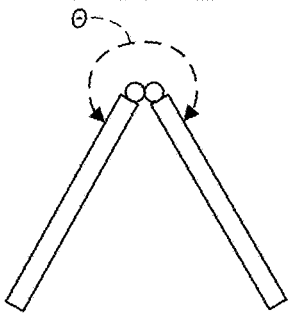
FIG. 1E shows the computing device of FIG. 1 in a tent pose with a hinge angle of 270°.
Figure 1D:
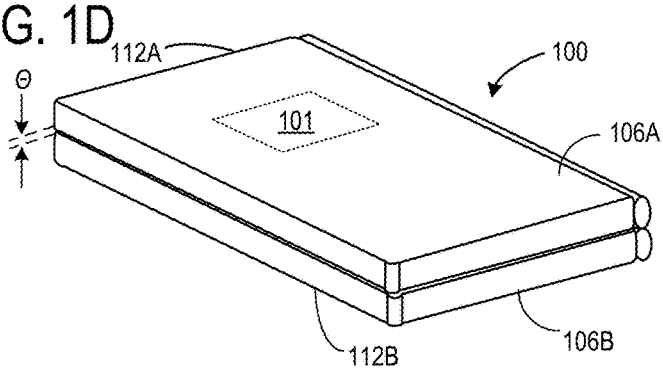
FIG. 1D shows the computing device of FIG. 1 in a closed pose with a hinge angle of 0°.

FIGS. 1A-1E illustrate the computing device 100 in various poses. FIG. 1A illustrates the computing device 100 in a flat, or open pose, with the hinge angle at 180 degrees. FIG. 1B illustrates the computing device 100 in a folded pose with the hinge angle at 45 degrees. FIG. 1C illustrates the computing device 100 in a back-to-back pose, with a hinge angle of 360 degrees. FIG. 1D illustrates the computing device 100 in a face-to-face pose, with a hinge angle of 0 degrees. FIG. 1E illustrates the computing device 100 in a tent pose, with a hinge angle of 270 degrees. For each pose, computing device 100 may be held in a plurality of orientations relative to gravity. This combination of hinge angle (pose) and device orientation relative to gravity is referred to herein as a posture of computing device 100. While this disclosure uses computing device 100 as an example, other hinged computing devices with differently-sized displays, three or more displays, panels with displays on both the front and back sides, different types of hinges, hinges with different ranges of motion, different touch detection technologies, and/or other differences relative to computing device 100 are also compatible with this disclosure.

Figure 2:
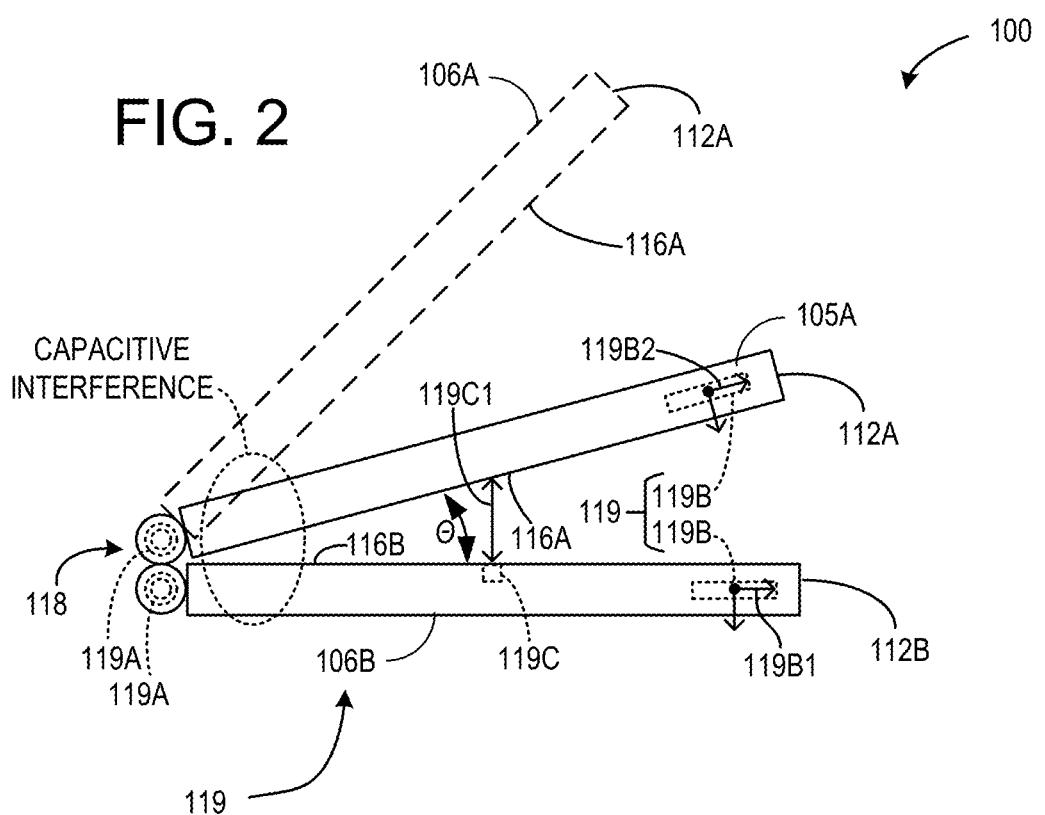
FIG. 2 is a bottom view of the computing device of FIG. 1, showing two configurations of a hinge angle sensor.

Turning now to FIG. 2, computing device 100 further includes one or more sensors 119 configured to detect the orientation of leaves 106A and 106B, and thus of the first and second touch displays 112A and 112B, in three-dimensions, and to detect the hinge angle between the first and second display surfaces 114A, 114B of the first and second touch displays 112A, 112B. As a nonlimiting example, the hinge angle sensor 119A may be a potentiometer (or variable resistor) positioned in the hinge 118 and configured to measure the angle of the hinge 118. In the illustrated embodiment, the hinge 118 is a double hinge and a hinge angle sensor 119A is provided in each hinge. By reading the measured value of each hinge angle sensor 119A, a total value for the hinge angle θ may be computed. Alternatively, a single hinge with a single potentiometer may be utilized.

In addition to or as an alternative to the one or more hinge angle sensors 119A, one or a pair of inertial measurement units (IMUs) 119B may be provided within sensors 119. In the depicted embodiment, a respective IMU 119B is positioned in each of the first and second touch displays 112A, 112B. Each IMU is configured to produce a respective six degree of freedom (6DOF) vector 119B1, 119B2 indicating its relative acceleration around three axes including a vertical axis that points toward the earth, as well as pitch, yaw, and roll. The hinge angle θ may be computed by subtracting the two 6DOF vectors. Instead of IMUs, other types of accelerometers or gyroscopes could be utilized to obtain similar measurements and compute the hinge angle. As yet another alternative, in addition or alternatively to the hinge angle sensor 119A and IMUs 119B, a depth camera 119C may be positioned in one of the first and second touch displays 112A, 112B and configured to measure a depth 119C1 to the opposite display device as an example. This depth 119C1 could be used to determine a hinge angle of the computing device 100 for values less than 90 degrees, for example. In other poses and postures, depth camera 119C may be used to determine a distance to a nearest surface other than a touch display, for example to a user.

Sensors 119 may further include one or more of compasses, visible light cameras (optionally coupled to facial recognition software), infrared cameras, ultraviolet light camera, Hall effect sensors, proximity sensors, temperature sensors, edge floating capacitance and/or resistance sensors, peripheral squeeze sensors, and/or other suitable sensors.

Figure 3:
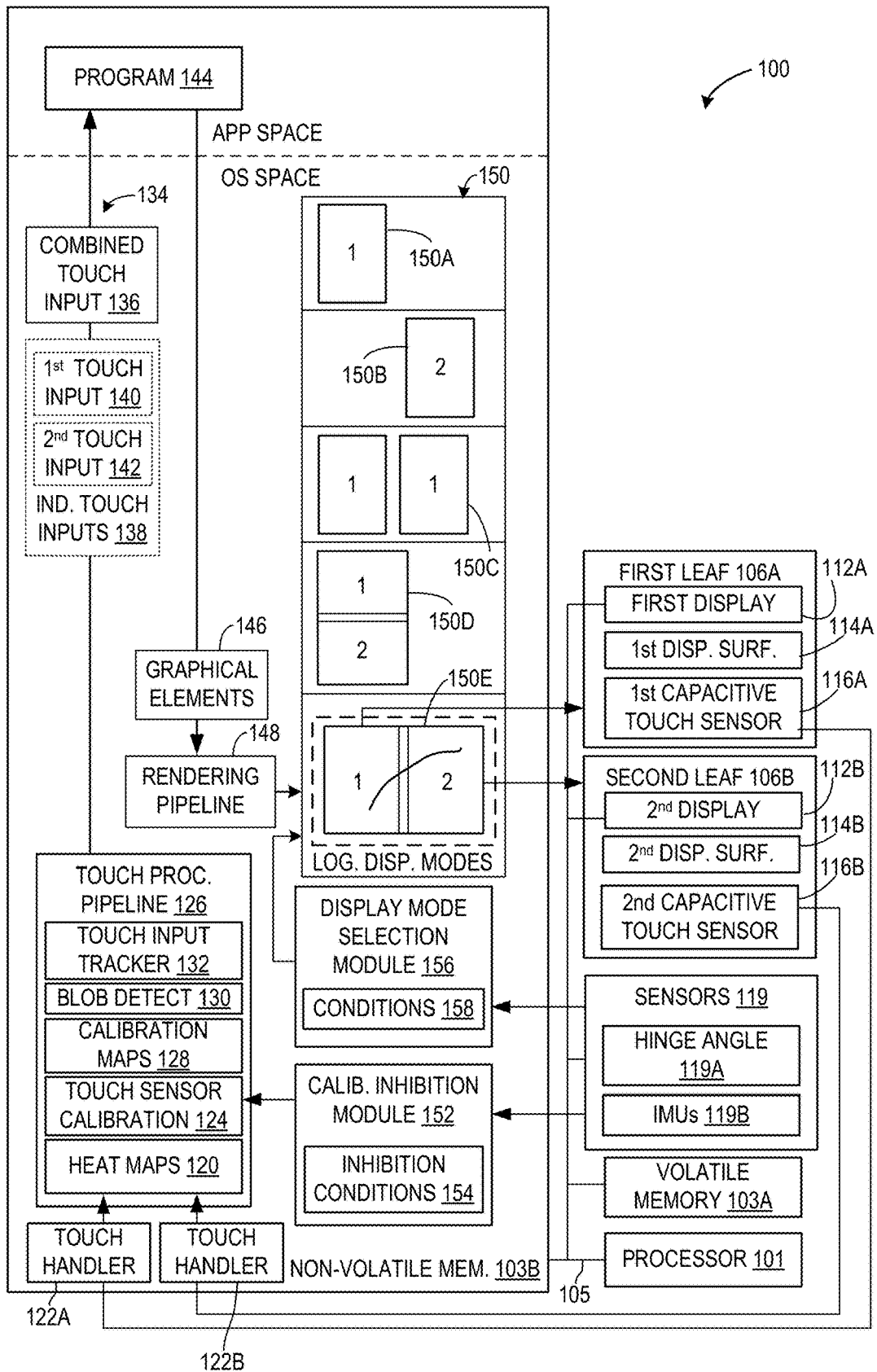
FIG. 3 is a schematic view illustrating software and hardware components of the computing device of FIG. 1.

Turning to FIG. 3, a nonlimiting software and hardware architecture of the computing device 100 is illustrated in schematic view. Processor 101 is illustrated as being connected via a bus 105 to a volatile memory 103A, non-volatile memory 103B, sensors 119, first touch display 112A, and second touch display 112B. Programs (e.g., program 144) stored in non-volatile memory 103B are executed by the processor 101 using portions of volatile memory 103A.

FIG. 3 generally illustrates a loop between detection of touch inputs and output of graphical elements for display. Beginning with the detection of touch inputs, during operation each of the first and second capacitive touch sensors 116A, 116B of the first and second touch displays 112A, 112B are configured to continuously output their capacitances in the form of heat maps (i.e., capacitive grid maps) 120 to an associated touch handler 122A, 122B for each touch display 112A, 112B. The touch handlers 122A, 122B optionally pass the heat maps 120 to a touch sensor calibration module 124 of a touch processing pipeline 126, which performs on the fly, i.e., real-time, touch sensor calibration by applying calibration maps 128 to the heat maps 120, to thereby produce calibrated capacitance maps. The calibrated capacitance map optionally is passed to a blob detection module 130, which determines the areas of the capacitive touch sensor 116A, 116B that are touched, after ignoring, i.e., rejecting, areas such as palms or forearms, which are not deemed part of the user's intended touch. The blob detection module 130 may be configured to detect and distinguish between touch and hover inputs. To achieve this, the blob detection module 130 may be configured to apply a first predetermined touch capacitance difference threshold to the adjusted capacitance map to discern where the display is being touched, and a second predetermined hover capacitance difference threshold, which is lower than the first predetermined touch capacitance difference threshold, to detect hover of a user's digit. In a typical application, a centroid of each blob detected by the blob detection module 130 is passed to a touch input tracker 132.

The touch input tracker 132 is configured to track various touches over time using tracking algorithms that take into account the size, position, and motion of each blob, and organize them into one or more touch inputs 134. On a multitouch display, for example, a first touch input 140 might be recognized as a series of contacts detected as a left index finger slides across the display and a second touch input 142 might be recognized as a series of contacts detected from a right index finger sliding across the display concurrently. A touch input typically begins with a digit down event when a blob is initially detected and ends with a digit up event when the tracked blob is detected as no longer being in contact. As will be described in detail below, the touch input tracker 132 processes the touch inputs differently depending on the detected hinge angle indicating the configuration of the first and second touch displays 112A, 112B. For example, when the hinge angle of the computing device 100 is around 180 degrees, a touch that extends across the hinge from the first to the second display device or from the second to the first display device is processed as a combined touch input 136, while in other modes such as tent mode, the touch inputs 134 from each capacitive touch sensor 116A, 116B are processed as independent touch inputs 138, such that the first touch input 140 and second touch input 142 are separately considered by the touch input tracker 132.

Heat maps 120 includes capacitance values for each touch-sensing pixel or capacitive grid point of each capacitive touch sensor matrix. Each heat map 120 is provided to the operating system directly from capacitive touch sensors 116A and 116B (e.g., without firmware first distilling the raw touch data into touch points). Touch handlers 122A and 122B may be configured to output heat map 120 based on capacitance measurements taken across capacitive touch sensors 116A and 116B. The digitizer may represent the capacitance of each point of the touch sensor matrix with a binary number having a selected bit depth.

Depending on the touch-sensing capabilities of the computing system hardware, touch processing pipeline 126 may receive one or more of the heat maps 120. The touch processing pipeline 126 may be configured to communicate the heat map(s) 120 to other OS components and/or programs 144, process the raw heat map(s) 120 for downstream consumption, and/or log the heat map(s) 120 for subsequent use. The heat map(s) 120 received by touch processing pipeline 126 provide a full complement of capacitance values measured by the capacitive sensors.

The heat map(s) 120 may include a capacitance value for each touch-sensing pixel or capacitive grid point of each capacitive touch sensor matrix of capacitive touch sensors 116A and 116B. In some examples, capacitance values for the entirety of the capacitive touch sensor may be provided to touch processing pipeline 126. In other examples, the included capacitance values may be thresholded, and capacitance values outside of such thresholds may be omitted from the heat map. The plurality of capacitance values representing detected touch input may collectively indicate a touch profile of touch input to the capacitive touch sensor.

Each heat map 120 thus presents a view of what is actually touching the display, rather than distilled individual touch points. The data for heat map 120 may be provided to touch processing pipeline 126 in a well-defined format; for example, the resolution, bit depth, data structure, and any compression may be consistently implemented so that touch processing pipeline 126 is able to unambiguously interpret received heat maps 120. Heat maps 120 may thus provide an indication of how a user is holding computing device 100. Heat maps 120 may only be updated periodically, such as when there is a threshold change in one or more detected blobs, be it a change in size, location, and/or force.

A model may be trained based on large sets of heat map training data, wherein each pixel or other touch sensing location is labeled (e.g., via a human annotator) to indicate what is causing that touch measurement (e.g., right index finger, left index finger, right middle finger, palm, etc.). The trained model may then receive new heat maps during use and output a likelihood that each pixel is being touched by each different possible body part. Model training may occur via machine learning, neural networks, etc. but the present disclosure is compatible with other model training and retraining techniques, such as heuristics, metaheuristics, matheuristics, recursion, etc.

When presented with a heat map, such a model, or a separate model, may output a likelihood of a user grip or contact pattern based on the heat map training data. Herein, it may be stated that a heat map input into a model or decision "indicates" that a computing device is likely to be held in a specific grip or contact pattern. Such heuristics, previously-trained machine learning models, and/or other suitable techniques may be used to generate, evaluate, assess, or otherwise vet those indications.

Processor 101 may be configured to execute a display mode selection module 156, which is configured to detect certain predetermined conditions 158 for selecting active displays. The conditions 158 may include that the hinge angle is within a certain range, as discussed below. Upon detecting the conditions for a particular display mode, the display mode selection module 156 is configured to select an appropriate display mode, as described in detail below.

Touch inputs 134 from the touch input tracker 132 and/or heat maps 120 may be passed to a program 144 executed by processor 101. The program 144 may be an application program, an operating system component, utility or driver program, etc. The program 144 contains program logic that processes the touch inputs 134 and generates appropriate graphical elements 146 for display. The graphical elements 146 are sent from the program 144 to a rendering pipeline 148 of the operating system of the computing device 100. The rendering pipeline 148 prepares the graphical elements for display on one or more of the first and second touch displays 112A, 112B. At any given time, depending on the hinge angle and vertical orientation of the computing device 100, along with pertinent information derived from heat maps 120, a suitable logical display mode is selected. The logical display mode may indicate, for example, that, as shown at 150A, only the first touch display 112A is active, or, as shown at 150B, only the second touch display 112B is active, and the graphical elements 146 should displayed on one or the other, whichever is active. The logical display mode may alternatively indicate that the graphical elements should be displayed on both display devices, referred to as display mirroring, such as shown at 150C. Finally, when a hinge angle is detected as being within a suitable range, a combined display mode 150 may be selected that extends the first and second touch display 112A, 112B into a single logical display. The combined display mode 150 may be oriented vertically or horizontally (so called picture or landscape) as illustrated at 150D and 150E.

Many device postures look alike from the internal perspective of the computing device. Solely using the hinge sensor and movement sensors (e.g., accelerometers, gyrometers, magnetometers) as the primary determinants of posture can lead to incorrect conclusions and result in an annoyed user. With a finite number of sensors and a mechanically complex device, the internal sensor suite has a limited number of degrees of accuracy in determining device posture. This may lead to guessing as to what the user intent is, which touch screen(s) they want to be active, and how they would like the display content to be oriented.

In particular, movement between postures is often misinterpreted through ambiguous signals. A user holding the computing device in a folded pose akin to a paperback book may switch from lying on their stomach to lying on their back, changing the orientation of the device but not desiring to change the display layout. A user may flip the device around itself while in a back-to-back pose. Similar flip motions may result in the first touch screen facing the user or the second touch screen facing the user. Further, similar motions may be incurred by the user showing the active display screen to another individual.

To disambiguate these poses and postures, touch heat maps generated while the user is holding the device may be used to inform the device posture, to more accurately determine whether each display is active, and how content is presented on each display. This improved detection may allow for a more pleasing user experience that may evolve as the user interacts with the device and with specific applications.

Figure 4:
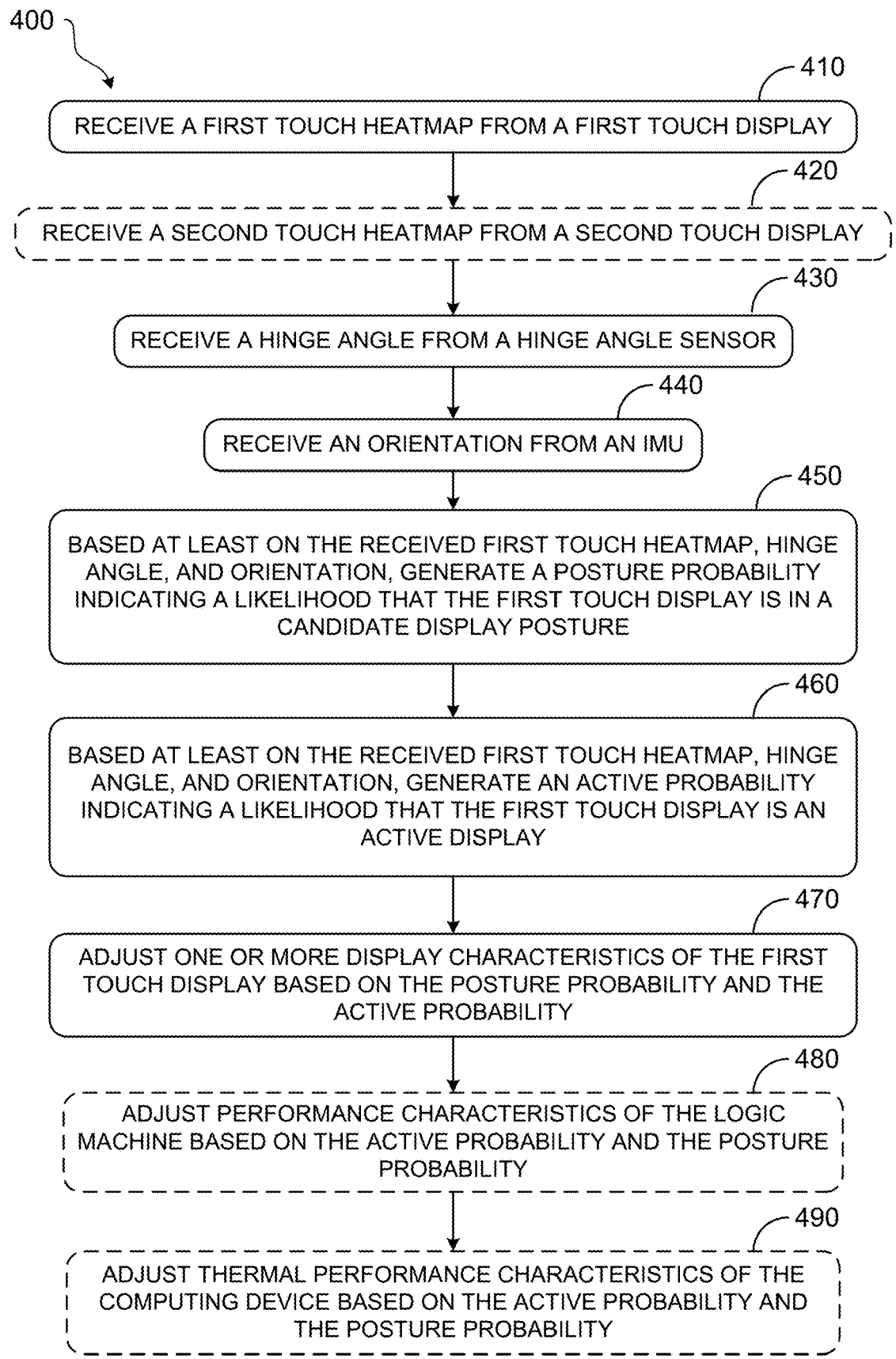
FIG. 4 is a method for adjusting display characteristics of a computing device.

FIG. 4 shows a computer-implemented method 400 for adjusting the display characteristics of a hinged, multi-leaf device, such as computing device 100, according to an embodiment of the present disclosure. Method 400 may be performed at a processor of the hinged, multi-leaf device, as an example. Additionally or alternatively, aspects of method 400 may be performed by one or more computing devices communicatively coupled to the hinged, multi-leaf device. While primarily described in the context of a multi-leaf device having multiple touch displays, method 400 is additionally or alternatively applicable to multi-screen devices where at least one display is a touch display and one or more displays) is not a touch display, and/or to multi-leaf devices that include one or more leaves that do not include displays, such as keyboards, trackpads, drum machines, other input devices, etc.

At 410, method 400 includes receiving a first touch heat map from a first touch display. Continuing at 420, method 400 optionally includes receiving a second touch heat map from a second touch display or any other leaf configured to receive and process touch input. In examples where the second display is a non-touch display or other device that does not sense touch input, only a first touch heat map may be received. As described with regards to FIG. 3, each heat map may be based on capacitive touch sensors within each touch display, and may indicate the location, size, and force of each point of contact and near contact on each touch display. In practice, such touch heat maps may be periodically received in a series, and the series of touch heat maps may collectively indicate how touch input is changing over time. As such, it is to be understood that method 400 may be continuously executed to account for changes in the manner the touch displays are being used over time.

At 430, method 400 includes receiving a hinge angle from the hinge angle sensor. In some examples, the hinge angle may be a raw output from the hinge angle sensor, such as a potentiometer output. Additionally or alternatively, the hinge angle may be processed to provide an angular reading between 0 and 360 degrees, inclusive. In some implementations, at 430, method 400 may consider inputs from two or more different time periods (e.g., from two or more consecutive hinge angle assessments).

At 440, method 400 includes receiving an orientation from the IMU. As described with regard to FIG. 3, the orientation may be based on signals received for each touch display, non-touch display, or other leaf from one or more inertial measurement units (IMUs) including accelerometers, gyrometers, magnetometers, etc., one or more cameras, and/or other orientation discerning sensors. Each orientation may be expressed as an absolute orientation within a suitable frame of reference (e.g., an orientation vector relative to gravity) and/or may be expressed as a relative orientation based on one or more previous orientations. In some implementations, at 440, method 400 may consider inputs from two or more different time periods (e.g., from two or more consecutive orientation assessments).

At 450, method 400 includes, based at least on the received first touch heat map, hinge angle, and orientation, generating a posture probability indicating a likelihood that the first touch display is in a candidate display posture. In examples where the second leaf includes a display, posture probabilities may be generated for candidate display postures for each display individually and/or as a combined unit. In some examples, a plurality of candidate postures may be evaluated, and posture probabilities generated for each of the plurality of display postures. In some implementations, at 450, method 400 may base the posture probabilities on inputs from two or more different time periods. In addition to and/or instead of heat maps, hinge angle, and orientation, other inputs may be considered (e.g., inputs from cameras, user profiles, or other sources) when generating the posture probabilities. In examples wherein the second leaf includes a second touch display or other touch sensitive input device, the posture probability may be generated based on touch heat maps received from the second leaf.

Continuing at 460, method 400 includes, based at least on the received first touch heat map, hinge angle, and orientation (e.g., for one or more time periods), generate active probabilities indicating a likelihood that the first touch display is an active touch display. In examples wherein the second leaf includes a second display, an active probability may be generated for the second display. In some implementations, at 460, method 400 may base the active probabilities on inputs from two or more different time periods. In addition to and/or instead of heat maps, hinge angle, and orientation, other inputs may be considered (e.g., inputs from cameras, user profiles, or other sources) when generating the active probabilities. In examples wherein the second leaf includes a second touch display or other touch sensitive input device, the active probabilities may be generated based on touch heat maps received from the second leaf.

At 470, method 400 includes adjusting one or more display characteristics of the first touch display and/or a second display based on one or more of the posture probabilities and one or more of the active probabilities. In some examples, the display characteristics adjusted in this manner include an on/off state of each touch and non-touch display, (e.g., "active" status). As such, for multi-display devices, either display or both displays may be turned on or off. In some examples, such as when the computing device is in a back-to-back pose, a touch display facing away from the user may allow user input controls via one or more user input zones even if the display portion of the display itself is turned off. As such, an "inactive" touch display may still retain some functionality.

In some examples, display characteristics include an orientation of content displayed by each display. In other words, the display may be rotated between a landscape orientation and a portrait orientation, may rotate 180 degrees responsive to the device being rotated 180 degrees, may adjust from a portrait orientation across two displays to a landscape orientation across one display responsive to the device being folded at the hinge, from a landscape orientation across two displays to a portrait orientation across one display responsive to the device being folded at the hinge, etc. Orientation on the different displays may be adjusted independently.

Figure 5A:
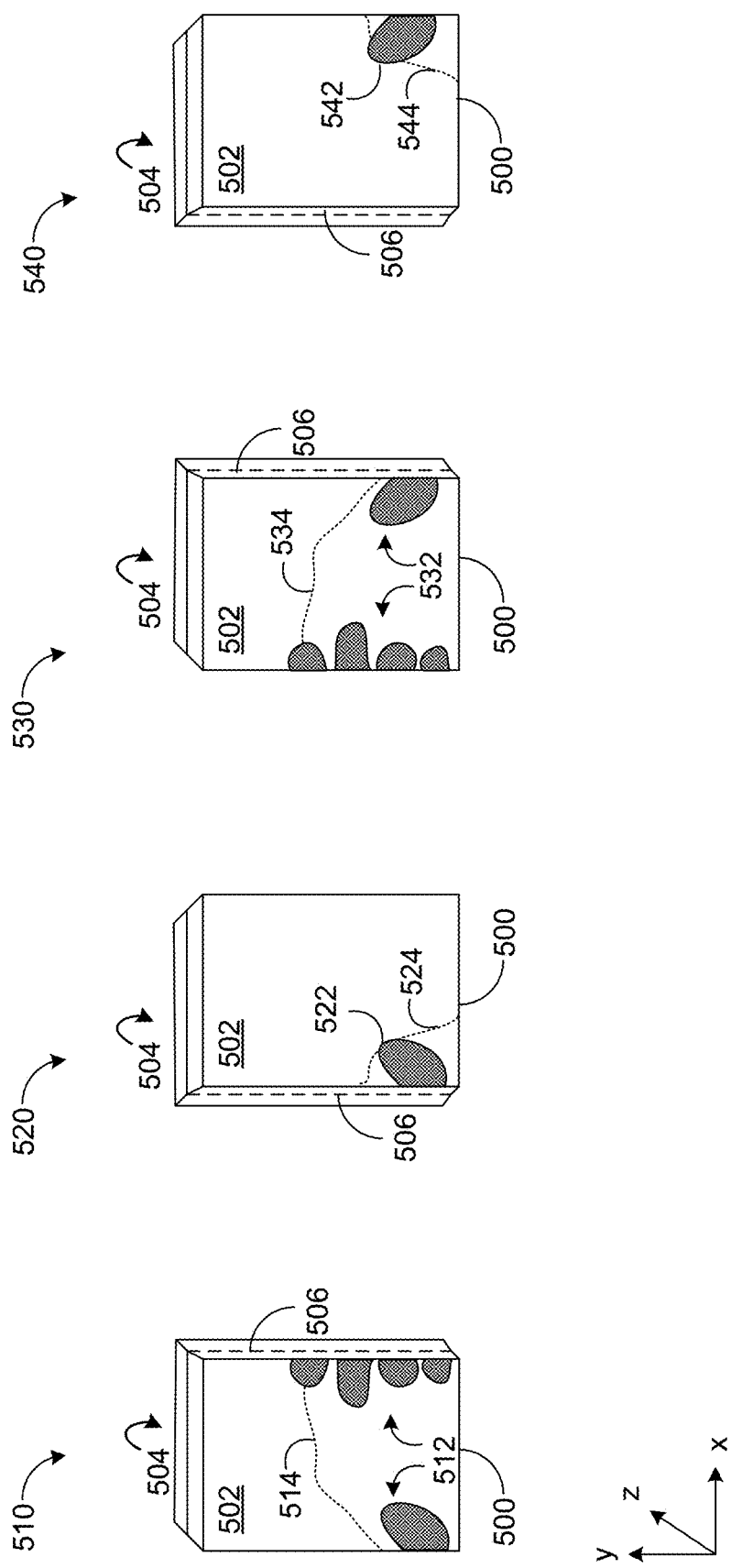
Figure 5B:
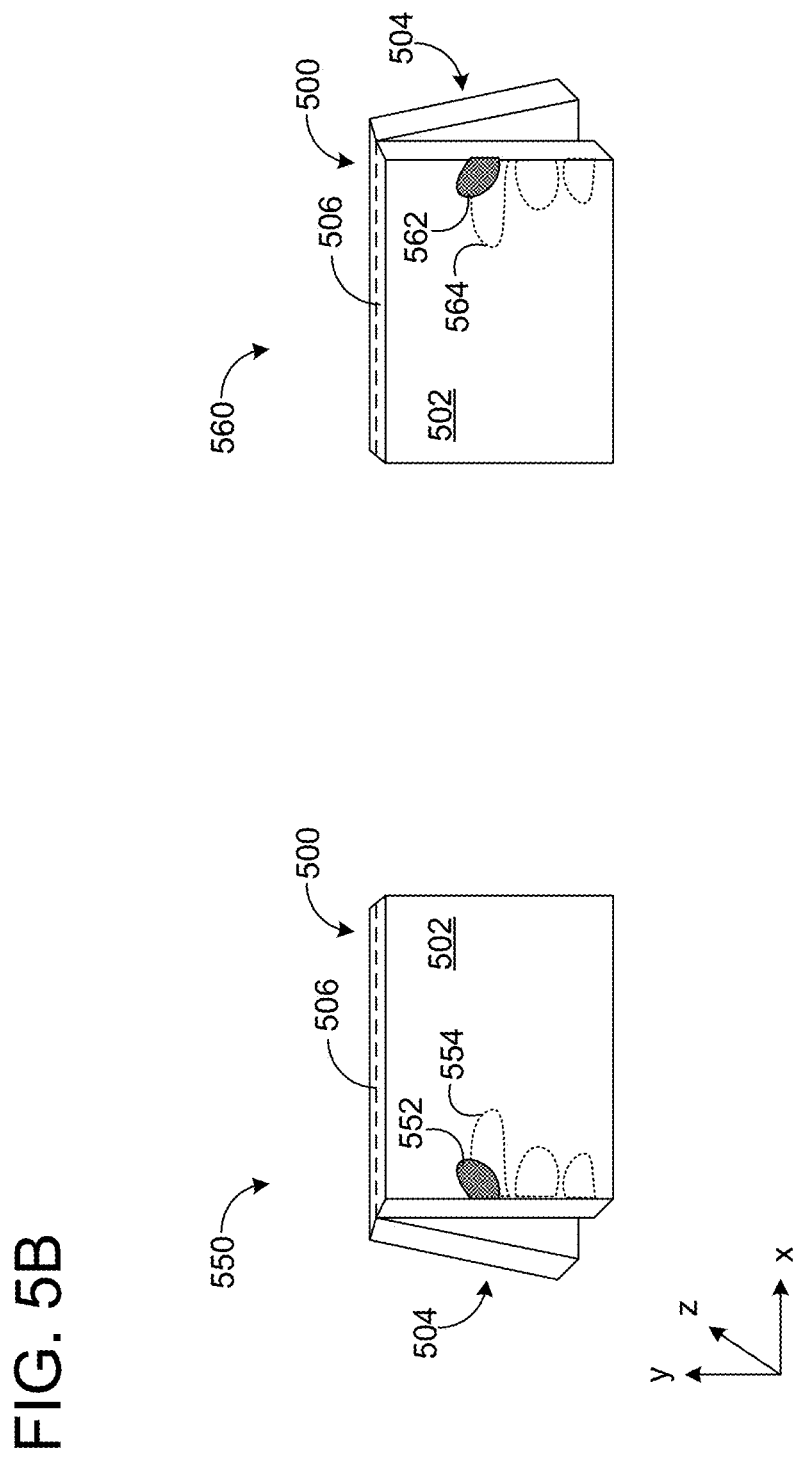

Some examples of postures derived from heat maps, hinge angles, and orientations are illustrated in FIGS. 5A-5C. Computing device 500 includes a first leaf including first touch display 502 and a second leaf including second touch display 504. First touch display 502 and second touch display 504 are rotatably coupled by hinge 506. Computing device 500 may be considered a simplified example of computing device 100. Heat maps for a visible touch display are shown as darkened blobs, while heat maps for a hidden touch display are shown as dashed outlines.

FIG. 5A illustrates examples of computing device 500 in a back-to-back pose. At 510, computing device 500 is shown with hinge 506 facing to the right. First heat map 512 indicates that both the thumb and fingers are contacting first touch display 502, while second heat map 514 indicates that the user's palm is contacting second touch display 504. From the device pose and heat maps, it may be deduced that computing device 500 is being held in a left-hand wraparound grip, with fingers wrapped around hinge 506. As such, first touch display 502 is likely to be active, second touch display 504 is likely to be inactive, and first touch display 502 is likely to be in a portrait orientation.

At 520, computing device 500 is shown with hinge 506 facing to the left (e.g., rotated 180 degrees around the z-axis from the posture shown at 510). First heat map 522 indicates that the user's thumb is contacting the lower left corner of first touch display 502, while second heat map 524 indicates that the user's knuckle and forefinger are contacting second touch display 504. From the device pose and heat maps, it may be deduced that computing device 500 is being held in a left-hand pinch grip, with the thumb and forefinger wrapped around hinge 506. As such, first touch display 502 is likely to be active, second touch display 504 is likely to be inactive, and first touch display 502 is likely to be in a portrait orientation.

At 530, computing device 500 is shown with hinge 506 facing to the right. First heat map 532 indicates that both the thumb and fingers are contacting first touch display 502, while second heat map 534 indicates that the user's palm contacting second touch display 504. From the device pose and heat maps, it may be deduced that computing device 500 is being held in a right-hand wraparound grip, with thumb right thumb wrapped around hinge 506. The thumb and finger placement in first heat map 532 distinguishes the right-handed posture shown at 530 from the left-handed posture shown at 510. As such, first touch display 502 is likely to be active, second touch display 504 is likely to be inactive, and first touch display 502 is likely to be in a portrait orientation.

At 540, computing device 500 is shown with hinge 506 facing to the left (e.g., rotated 180 degrees around the z-axis from the posture shown at 530). First heat map 542 indicates that the user's thumb is contacting the lower right corner of first touch display 502, while second heat map 544 indicates that the user's knuckle and forefinger are contacting second touch display 504. From the device pose and heat maps, it may be deduced that computing device 500 is being held in a right-hand pinch grip, with the thumb and forefinger opposite hinge 506. The right corner grip distinguishes the posture from that shown at 520. As such, first touch display 502 is likely to be active, second touch display 504 is likely to be inactive, and first touch display 502 is likely to be in a portrait orientation.

FIG. 5B illustrates examples of computing device 500 in a tent pose with hinge 506 facing up. At 550, first heat map 552 indicates that the user's thumb is contacting the left side of first touch display 502, while second heat map 554 indicates that the user's middle, ring, and pinky fingers are contacting the left side of second touch display 504. From the hinge angle, it may be deduced that the user's index finger is likely to be positioned in between first touch display 502 and second touch display 504. From the device pose, hinge angle, and heat maps, it may be deduced that computing device 500 is likely to be held in a left-hand grip, with the forefinger under hinge 506. As such, first touch display 502 is likely to be active, second touch display 504 is likely to be inactive, and first touch display 502 is likely to be in a landscape orientation.

At 560, first heat map 562 indicates that the user's thumb is contacting the right side of first touch display 502, while second heat map 564 indicates that the user's middle, ring, and pinky fingers are contacting the right side of second touch display 504. From the hinge angle, it may be deduced that the user's index finger is likely to be positioned in between first touch display 502 and second touch display 504. From the device pose, hinge angle, and heat maps, it may be deduced that computing device 500 is likely to be held in a right-hand grip, with the forefinger under hinge 506. As such, first touch display 502 is likely to be active, second touch display 504 is likely to be inactive, and first touch display 502 is likely to be in a landscape orientation. The heat map indicating the right-hand side grip distinguishes the posture at 560 from that at 550.

FIG. 5C illustrates examples of computing device 500 in an open pose. If the user is holding the computing device with both hands in such a pose, the movement sensors alone will not discern whether the touch displays should be configured in a landscape mode or portrait mode. At 570, first heat map 572 is empty, and second heat map 574 indicates that the user's thumbs are contacting opposite sides of second touch display 504. As such, both first touch display 502 and second touch display 504 are likely to be active, and the combined display is likely to be in a portrait orientation. In contrast, at 580, first heat map 582 indicates that the user's left thumb is contacting first touch display 502, while second heat map 584 indicates that the user's right thumb is contacting second touch display 504. As such, both first touch display 502 and second touch display 504 are likely to be active, and the combined display is likely to be in a landscape orientation.

At 590, first heat map 592 indicates that a portion of the user's thumb is contacting the bottom right corner of first touch display 502, and a portion of the same thumb is contacting the bottom left corner of second touch display 504. As such, both first touch display 502 and second touch display 504 are likely to be active, and the combined display is likely to be in a landscape orientation, with the user holding computing device 500 with a single-handed grip (e.g., paperback book posture). Using these heat maps, the angle range and orientation of the device, and thus the posture, may be deduced. If the user changes their orientation (e.g., from lying on their stomach to lying on their back), while the device orientation changes, the heat map will change minimally, and the display characteristics can be maintained.

In some examples, method 400 includes determining a display-usage gesture based at least on the received hinge angle and orientation, wherein generating active probabilities and/or posture probabilities is further based on the determined display-usage gesture. A display-usage gesture may include a conformation change, a configuration change, an orientation change, and/or movement between the first leaf and second leaf relative to each other and/or to a suitable frame of reference (e.g., gravity) that is of great enough magnitude to potentially trigger a change in active status for one or more displays, and/or a posture change that may result in a change in display characteristics for one or more displays.

Such display-usage gestures may be determined based on changes in hinge angle and device orientation as determined via multi-axis sensors (e.g., IMU signal output). However, using just these two inputs leads to ambiguous gestures where the computing device may easily make an incorrect decision as to touch display activity, orientation, or other display characteristics. By incorporating heat maps from the first touch display and, where applicable, a second touch display or other touch input device from prior to, during, and/or following the gesture, this ambiguity may be resolved.

Figure 6A:
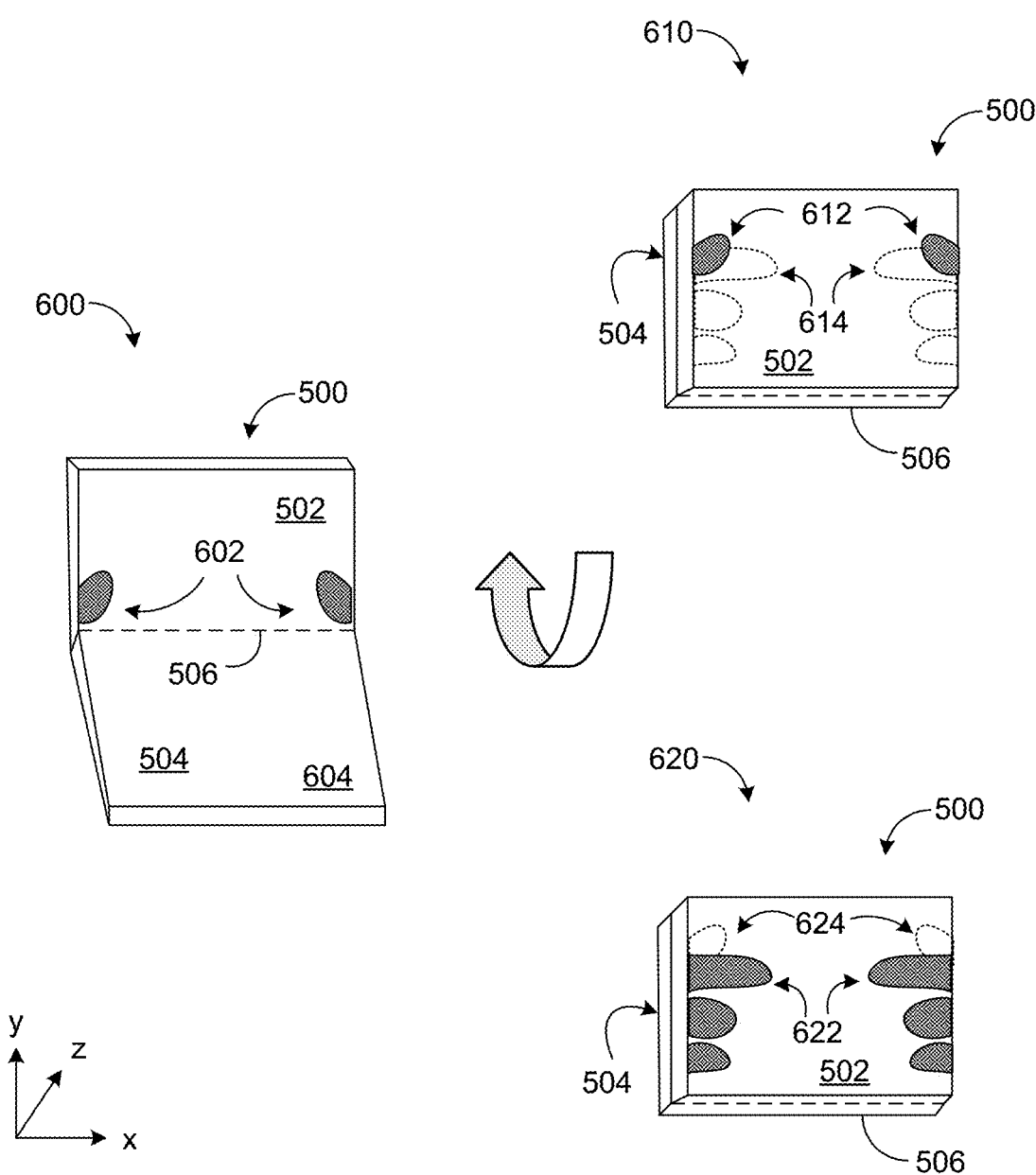
FIGS. 6A-6B illustrate gestures performed by a user holding a computing device.

As an example, FIG. 6A illustrates a fold gesture, wherein the hinge angle is increased from a threshold angle (e.g., open pose or folded pose, hinge angle≤180 degrees) to within a threshold of a 360 degree angle and/or substantially a back-to-back pose (as shown, following rotation around the x-axis). At 600, first heat map 602 indicates that the user's thumbs are contacting opposite sides of first touch display 502, second heat map 604 is empty, and both touch displays are active. If the user performs a fold gesture, either first touch display 502 or second touch display 504 is going to be de-activated. While users may have learnable tendencies for this display-use gesture, such a tendency is not always indicative of what the user is expecting from the device at a specific incidence.

The touch display that is most likely to be the user's intended active display may be determined by heat maps indicating how the user is holding the device prior to, during, and/or after the gesture. If one of the touch displays outputs a heat map exhibiting substantial coverage of the display, it is likely that the user is holding that side of the device and look at the other touch display.

For example, at 610, first heat map 612 indicates that the user's thumbs are contacting opposite sides of first touch display 502, while second heat map 614 indicates that the fingers from both hands of the user are contacting the opposing sides of second touch display 504. Thus, it is likely that the user is holding the computing device so that first touch display 502 is relatively unobstructed, and thus active.

At 620, the opposite scenario is illustrated. First heat map 622 indicates that the fingers from both hands of the user are contacting the opposing sides of first touch display 502, while second heat map 624 indicates that the user's thumbs are contacting opposite sides of second touch display 504. Thus, it is likely that the user is holding the computing device so that second touch display 502 is relatively unobstructed, and thus active.

Figure 6B:
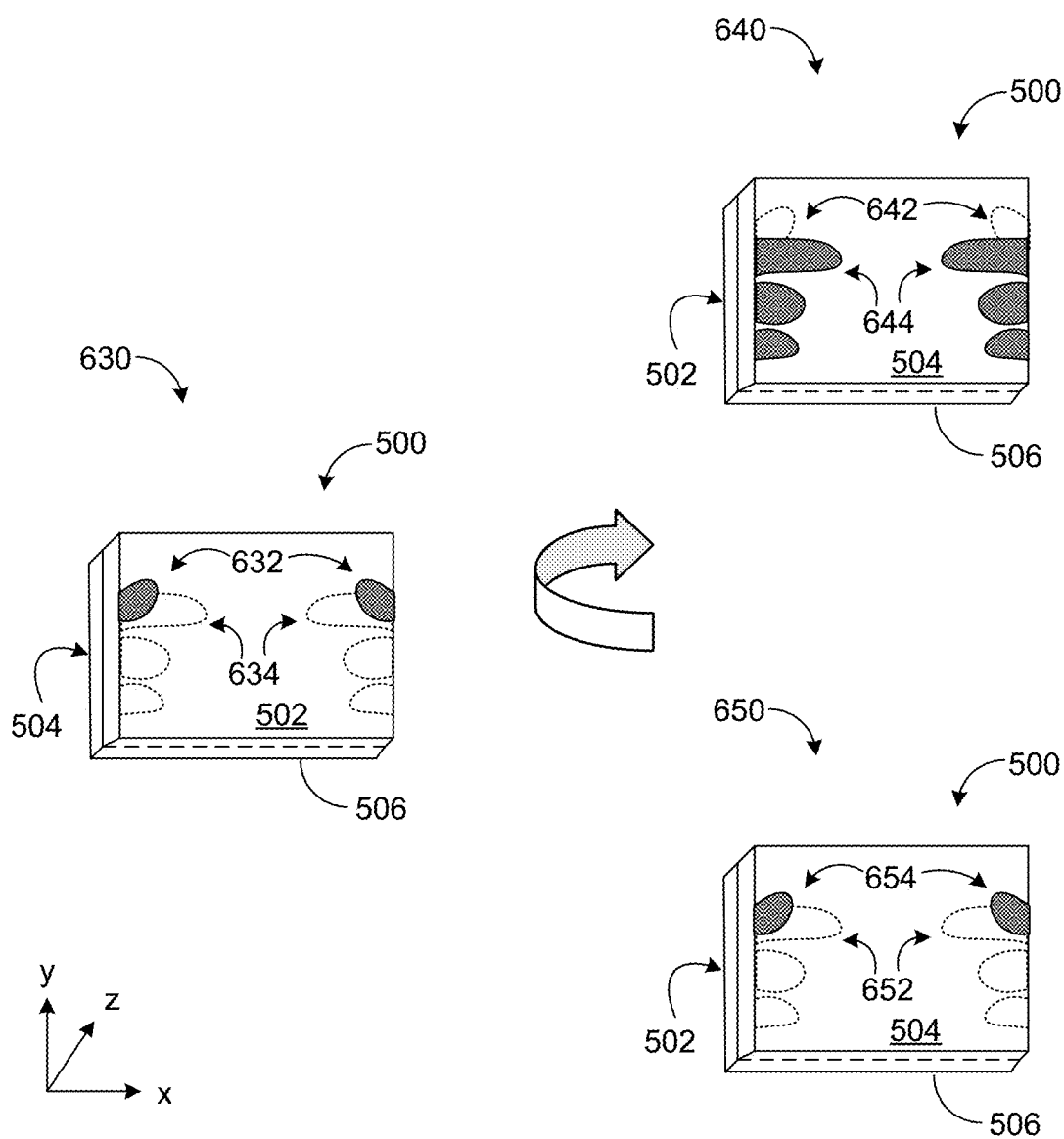

As another example, FIG. 6B illustrates a flip gesture, wherein the hinge angle is set to within a threshold of 360 degrees (substantially back-to-back pose), and wherein the computing device is rotated (e.g., 180 degrees around the y-axis) so that orientation of the first and second touch displays is switched relative to a suitable frame of reference (e.g., gravity).

At 630, first heat map 632 indicates that the user's thumbs are contacting opposite sides of first touch display 502, while second heat map 634 indicates that the fingers from both hands of the user are contacting the opposing sides of second touch display 504. If the user is looking at something on first touch display 502 and wants to show it to another user, they would likely flip that touch display towards the other user while maintaining the same orientation. If the user merely wants to change the active touch display on the computing device because it is dirty, the orientation data for the gesture would be similar. If the user is just swiveling in a chair, from the IMU sensor point of view, the intended orientation may be ambiguous.

This disparity can be resolved by incorporating the heat maps into the probability determination. For example, at 640, the orientation of computing device 500 has flipped 180 degrees around the y-axis, but first heat map 642 and second heat map 644 are substantially identical to first heat map 632 and second heat map 634. This indicates that the most likely scenario is that the user has flipped computing device to present first touch display 502 to another individual. In contrast, at 650, first heat map 652 indicates that the fingers from both hands of the user are contacting the opposing sides of first touch display 502, and second heat map 654 indicates that the user's thumbs are contacting opposite sides of second touch display 504. This indicates that the most likely scenario is that the user has flipped computing device 500 with the intention of viewing second touch display 504.

Returning to FIG. 4, at 480, method 400 optionally includes adjusting one or more performance characteristics of the logic machine based on the posture probabilities and the active probabilities. For example, performance characteristics may include power calibration, voltage scaling, frequency modulation, under/overclocking, processor throttling, core usage distribution, etc. Continuing at 490, method 400 optionally includes adjusting one or more thermal performance characteristics of the computing device based on the posture probabilities and the active probabilities.

For example, the central processor or system-on-a-chip may reside within the first touch display. If that touch display is active, and the user is holding only the second leaf, the performance of the processor may be driven higher, and thus hotter, because the user's fingers will not directly experience the increased heat. If the computing device is in a tent pose and the user is determined to not be holding the computing device based on the heat maps for the first and second touch displays, the processor may be run at maximum performance, and thus maximum heat, without regard for adversely exposing the user to uncomfortable heat. Likewise, a processor may be downthrottled to run cooler if the user's grip is determined to subject the user to heat from the processor.

In some examples, adjusting one or more thermal performance characteristics of the computing device includes adjusting the position of one or more heat dissipation zones within the computing device. In this way, heat generated by the processor may be dissipated away from the user's hands.

Figure 7A:
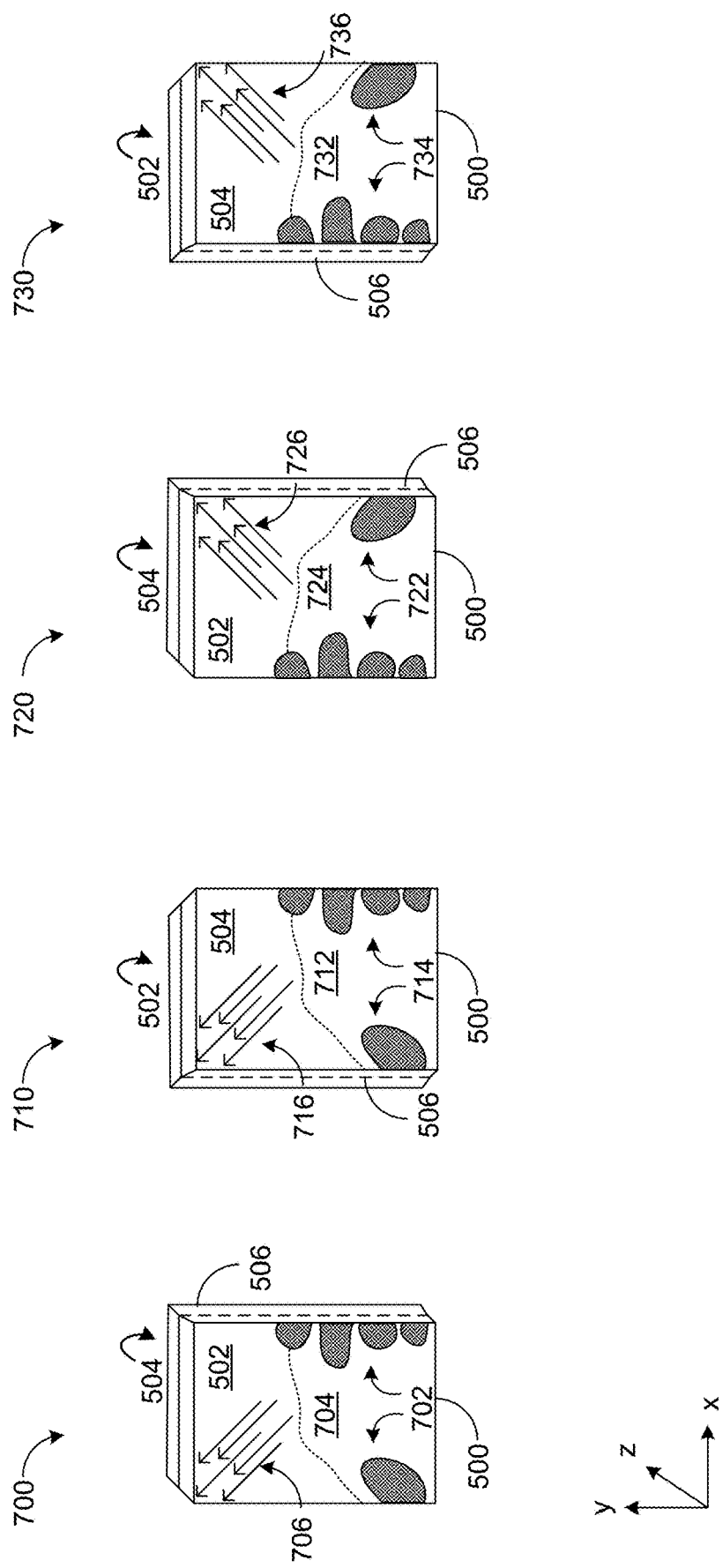
FIGS. 7A-7C illustrate thermal management for a computing device in a variety of postures.
Figure 7B:
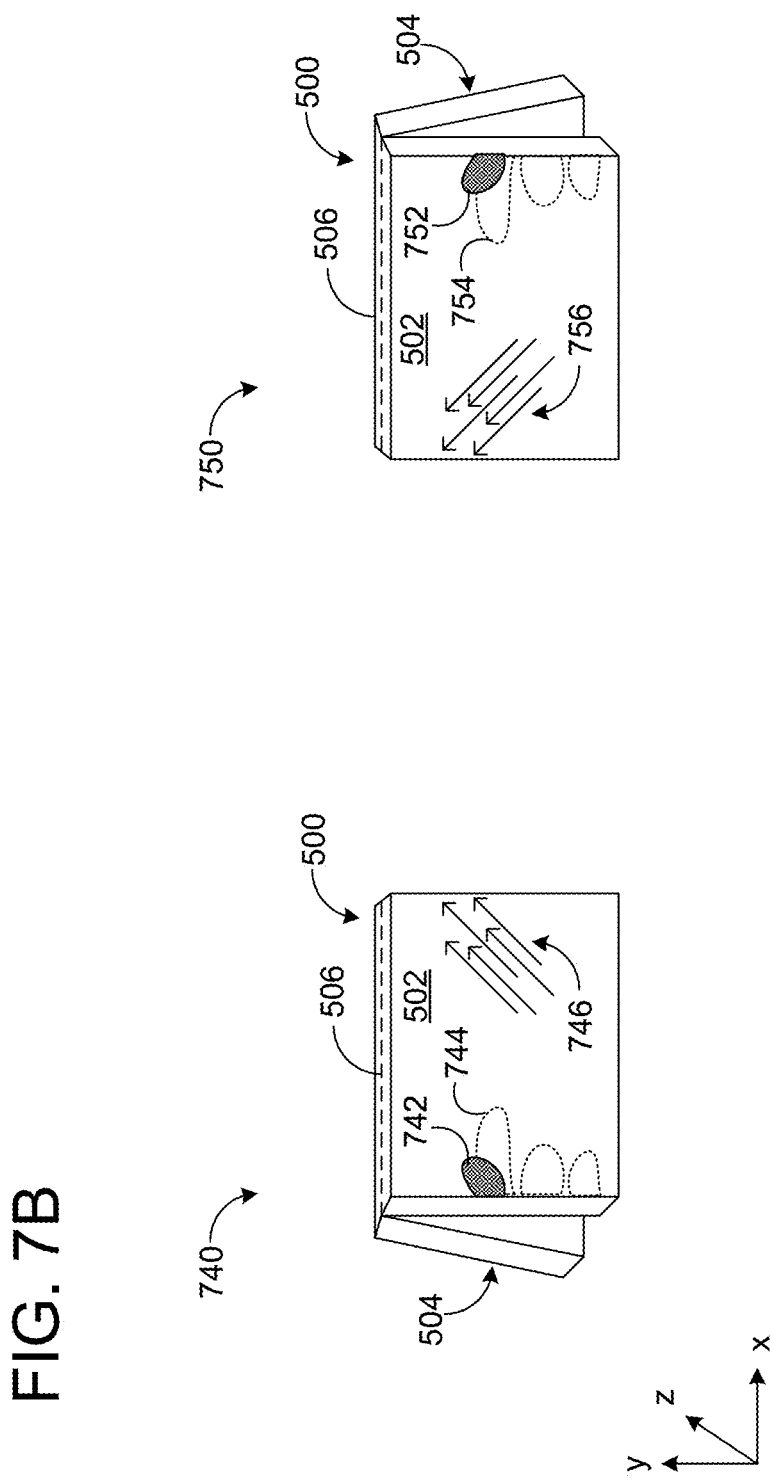
Figure 7C:
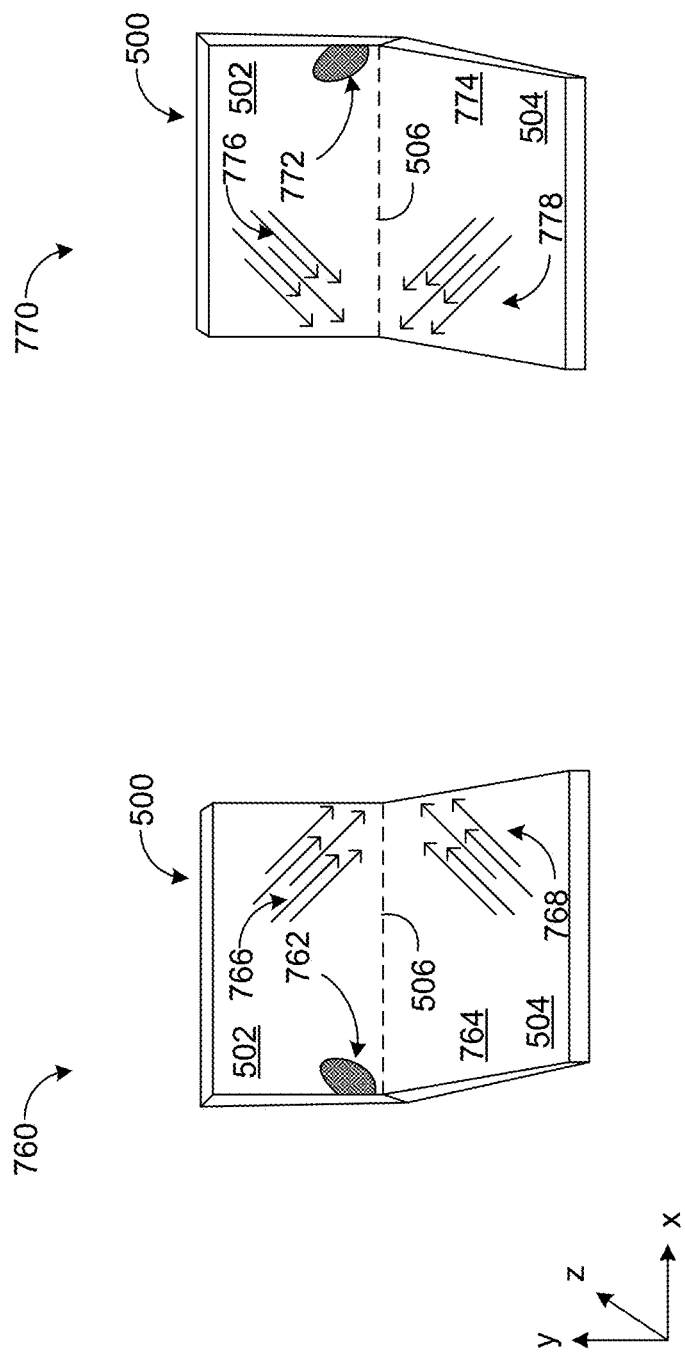

Some examples of heat dissipation zones positioned based on heat maps, hinge angles, and orientations are illustrated in FIGS. 7A-7C. FIG. 7A illustrates examples of computing device 500 in a back-to-back pose. At 700, computing device 500 is shown with hinge 506 facing to the right. First heat map 702 indicates that both the thumb and fingers are contacting first touch display 502, while second heat map 704 indicates that the user's palm is contacting second touch display 504. From the device pose and heat maps, it may be deduced that computing device 500 is being held in a left-hand wraparound grip, with fingers wrapped around hinge 506. Accordingly, heat dissipation zone 706 may be positioned so that heat dissipates from the upper left corner of the surface of first touch display 502, opposite hinge 506. In this way, heat dissipates away from the palm of the user in contact with second touch display 504 and away from the fingers and thumb at the edges of first touch display 502.

At 710, computing device 500 is shown with hinge 506 facing to the left. First heat map 712 indicates that the user's palm is contacting first touch display 502, while second heat map 704 indicates that both the thumb and fingers are contacting second touch display 504. From the device pose and heat maps, it may be deduced that computing device 500 is being held in a left-hand wraparound grip, with the thumb wrapped around hinge 506. Accordingly, heat dissipation zone 716 may be positioned so that heat dissipates from the upper left corner of the surface of second touch display 504, near hinge 506. In this way, heat dissipates away from the palm of the user in contact with first touch display 502 and away from the fingers and thumb at the edges of first touch display 502.

At 720, computing device 500 is shown with hinge 506 facing to the right. First heat map 722 indicates that both the thumb and fingers are contacting first touch display 502, while second heat map 724 indicates that the user's palm is contacting second touch display 504. From the device pose and heat maps, it may be deduced that computing device 500 is being held in a right-hand wraparound grip, with the thumb wrapped around hinge 506. Accordingly, heat dissipation zone 726 may be positioned so that heat dissipates from the upper right corner of the surface of first touch display 502, near hinge 506.

At 730, computing device 500 is shown with hinge 506 facing to the left. First heat map 732 indicates that the user's palm is contacting first touch display 502, while second heat map 734 indicates that both the thumb and fingers are contacting second touch display 504. From the device pose and heat maps, it may be deduced that computing device 500 is being held in a right-hand wraparound grip, with the fingers wrapped around hinge 506. Accordingly, heat dissipation zone 736 may be positioned so that heat dissipates from the upper right corner of the surface of second touch display 504, opposite hinge 506.

FIG. 7B illustrates examples of computing device 500 in a tent pose with hinge 506 facing up. At 740, first heat map 742 indicates that the user's thumb is contacting the left side of first touch display 502, while second heat map 744 indicates that the user's middle, ring, and pinky fingers are contacting the left side of second touch display 504. From the device pose, hinge angle, and heat maps, it may be deduced that computing device 500 is likely to be held in a left-hand grip, with the forefinger under hinge 506. Accordingly, heat dissipation zone 746 may be positioned so that heat dissipates from the right-hand side of the surface of first touch display 502.

At 750, first heat map 752 indicates that the user's thumb is contacting the right side of first touch display 502, while second heat map 754 indicates that the user's middle, ring, and pinky fingers are contacting the right side of second touch display 504. From the device pose, hinge angle, and heat maps, it may be deduced that computing device 500 is likely to be held in a right-hand grip, with the forefinger under hinge 506. Accordingly, heat dissipation zone 756 may be positioned so that heat dissipates from the left-hand side of the surface of first touch display 502.

FIG. 7C illustrates examples of computing device 500 in an open pose. At 760, first heat map 762 indicates that the user's thumb is contacting the left-hand side of first touch display 502, and second heat map 764 is empty. As such, it may be deduced that the user is holding computing device 500 with the left-hand. Accordingly, heat dissipation zones 766 and 768 may be positioned on the right-hand sides of first touch display 502 and second touch display 504, respectively.

At 770, first heat map 772 indicates that the user's thumb is contacting the right-hand side of first touch display 502, and second heat map 774 is empty. As such, it may be deduced that the user is holding computing device 500 with the right-hand. Accordingly, heat dissipation zones 776 and 778 may be positioned on the left-hand sides of first touch display 502 and second touch display 504, respectively.

In some examples, the display characteristics include display positions of display objects on each touch and/or non-touch display. For example, objects may be repositioned on one touch display to avoid being obscured by a user's finger as determined by one or more heat map.

Additionally or alternatively, display characteristics may include positions of user input zones on each touch display. In this context, user input zones may refer to portions of either touch display that are designated for specific user input, such as buttons, icons, keyboards, other touch sensitive commands and controls, etc. As described herein, user input zones may be located on an otherwise inactive touch display, and thus may not be accompanied by a graphic representation on a display. Rather, the user input zone may include a portion of a capacitive touch sensor that triggers a specific response responsive to touch input. As an example, if the computing device is in an open pose, where both touch displays are active, a keyboard may be centered on one display or the other, based at least on the heat maps, and in some examples, based on user handedness or other preferences. If the computing device is in a back-to-back pose being held with one hand, such as shown at 520 in FIG. 5A, certain user input zones may be positioned towards the thumb of the user for easy access, while other user input zones may be positioned away from the thumb of the user, to facilitate touch input with the opposite hand.

In these, and other examples, the active probabilities and the posture probabilities may be further based on device usage parameters and/or further based on stored user parameters indicating a handedness of the user. These examples are described further herein and with regard to FIG. 8.

Figure 8:
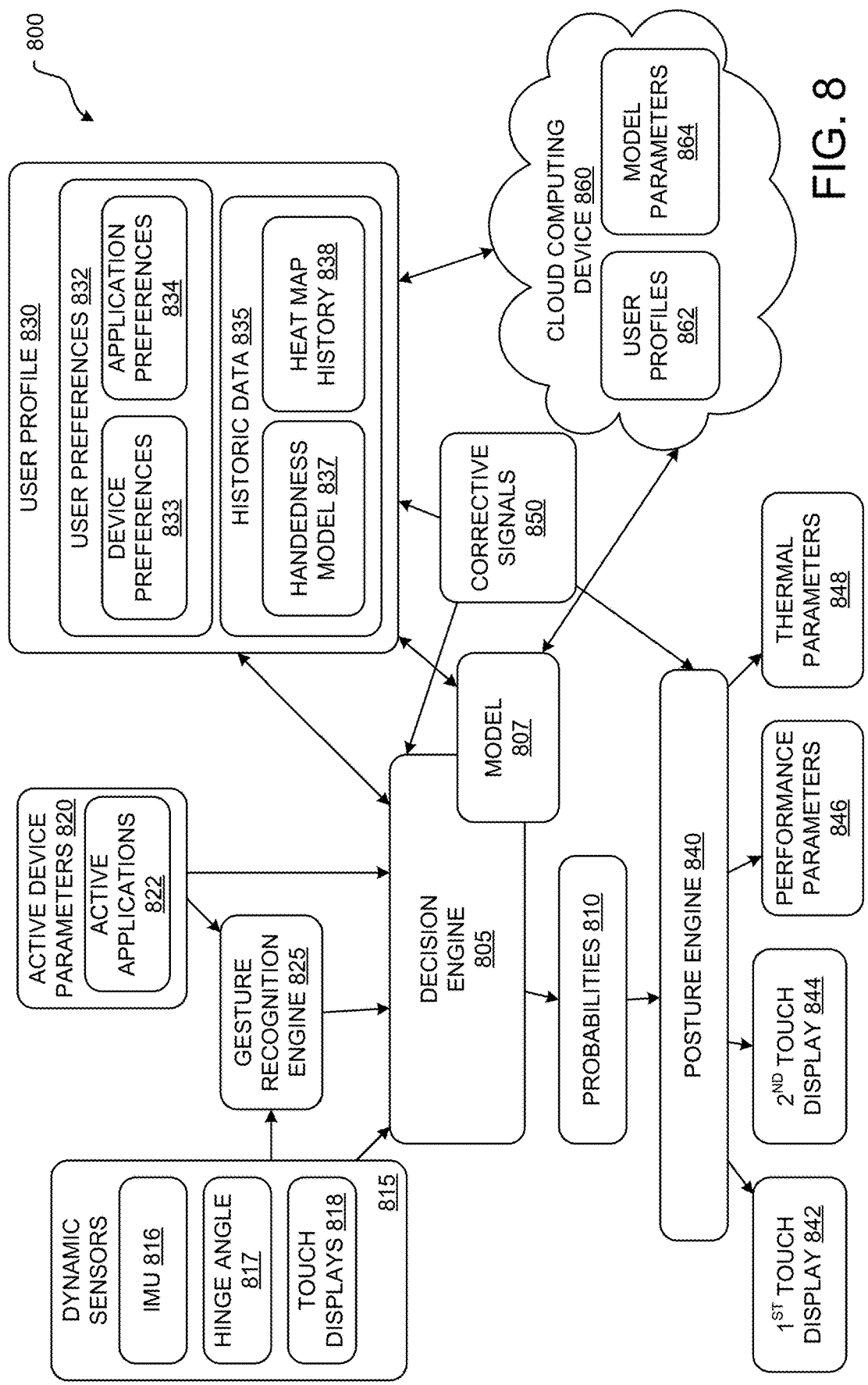
FIG. 8 is a schematic view of a system for determining posture probabilities and active display probabilities for a computing device.

FIG. 8 schematically shows an example system 800 that may be used to generate active probabilities and posture probabilities for a hinged, multi-display computing device, such as computing device 100. System 800 may further be used to set parameters for a computing device based on the generated probabilities. Additionally, system 800 may be used to both train and retrain a model for probability generation based on user habits over time.

System 800 comprises a decision engine 805 that operates a predictive model 807. Decision engine 805 may output one or more probabilities 810, such as active probabilities and posture probabilities, indicating a likelihood of a touch display device being active and a likelihood of each active touch display device or combined display device being in a particular orientation, as described herein. Model 807 may be configured to evaluate dynamic data based on at least static user data. Model 807 may employ one or more neural networks, such as recurrent neural networks or other neural networks configured to analyze sequential input data. Model 807 may employ a fusion of dynamic data with static data that has been learned from user behavior and user patterns in order to determine what is most likely to be happening at the device, akin to dynamically building a distributed neural network.

Decision engine 805 may receive dynamic data inputs from dynamic sensors 815. Dynamic sensors 815 may include, but are not limited to, IMU 816, hinge angle sensor 817, and touch displays 818. As described with regard to FIG. 3, dynamic sensors may further include a compass, cameras, time-of-flight sensors, hall and/or other proximity sensors, ambient light sensors, UV sensors, temperature sensors, edge capacitance/resistance sensors, etc. As an example, a capacitive touch input may be used to generate heat maps for the touch displays as described herein. In some examples, heat maps may only be updated when a significant change in the heat map occurs. Decision engine 805 may also receive dynamic input from active device parameters 820, which may include active application parameters 822. For example, active device parameters may include battery charge, brightness level, audio settings, network settings, etc., while active application parameters may include any settings or parameters for applications that are currently open and/or being used, particularly if the parameters for one application conflict or override device parameters or parameters for other applications.

In some examples, dynamic sensors 815 and active device parameters 820 may provide dynamic input to gesture recognition engine 825. Gesture recognition engine 825 may be configured to evaluate output from dynamic sensors 815 in the context of active device parameters 820 to determine whether the user has performed one or more display-usage gestures, as described with regard to FIG. 6. If a display-usage gesture has been performed, gesture recognition engine may provide the nature of the display-usage gesture to decision engine 805.

Decision engine 805 may receive static user data from user profile 830. User profile 830 may include user preferences 832, such as device preferences 833 and application preferences 834. Device preferences 833 and application preferences 834 may include preferences set by the computing device, preferences actively indicated by the user, and/or preferences learned based on user activity over time. User profile 830 may further include historic data 835, including handedness model 837 and heat map history 838.

Handedness model 837 may indicate whether the user is predominantly right-handed or left-handed. This indication may be based on a user selected preference, learned tendencies for the user, heat maps, and/or a combination thereof. Handedness model 837 may model which hand(s) the user tends to use to hold the computing device in certain situations, and which hand(s) the users tends to use for input to the computing device in certain situations.

Generally, computing devices that use heat maps do so from the perspective of palm rejection or for improving touch input accuracy or stylus pen accuracy. However, handedness model 837 may extend the model of handedness beyond simple heat maps to include looking at the which of the touch displays are predominantly active in certain scenarios, irrespective of what the handedness guess is. For example, handedness model 837 may determine whether the user predominantly uses the right touch display or the left touch display as an input for determining active probabilities for whether each display screen is going to be active. Heat map history 838 may thus include context aware heat maps that indicate corresponding usage tendencies, for example, which app was being used, what the device posture was when the heat map was recorded, etc. In this way, a newly received heat map may be compared to stored heat maps from similar postures and use scenarios.

For example, a gaming app may employ predetermined joystick controls, irrespective of whether the user is left-handed or right-handed. In such an example, the user's heat map will be roughly identical whatever the user's handedness is. Conversely, a game with customizable joystick controls where the user can deliberately position user input zones may provide information that can be used to determine user handedness.

Decision engine 805 may thus evolve along with model 807 as the user gains experience with the computing device, and as use cases for postures accumulate. Initially, decision engine 805 may provide equal weights to device preferences 833, application preferences 834, handedness model 837, and heat map history 838 when evaluating dynamic sensor data. The output probabilities 810 may then be evaluated by posture engine 840 to determine device parameters. As more data is collected over time, the user profile entries may accumulate metadata indicating a time of day, a day of the week, a physical location, types of task, frequently used apps, etc. Cross-referencing these user preferences with handedness model 837, heat map history 838, device postures for an application, etc. allow for refining model 807 and for more accurately ascribing a probability. Over a larger data set, weights for each of the inputs may be generated based on the usage patterns to increase the reliability of model 807 through local refinement based on user profile 830.

Probabilities 810 output by decision engine 805 may be provided to posture engine 840. Posture engine 840 may evaluate probabilities 810 and output control signals that indicate parameters for the computing device, such as $1^{st}$ touch display parameters 842, $2^{nd}$ touch display parameters 844 performance parameters 846, and thermal parameters 848.

Heat maps are complex data forms. As such, refining model 807 to adjust for handedness, hand size, and personal preference in holding the device may be a gradual process. This refinement of model 807 may be aided through the user of corrective signals 850. Corrective signals 850 may include at least direct user correction and corrective user input errors. For example, system 800 may enable the user to correct an incorrect prediction for the active display (e.g., by double-tapping on the inactive display). Additionally, the user may make correctable errors if a user input zone is positioned non-ergonomically for the user's grip (e.g., the user makes typing errors that would be corrected if the input keyboard was shifted towards their right-hand).

Model 807 can then make use of the models and parameters it was comparing when the original determination was made, and the corrective signal may provide a label that indicates what determination should have been made. The model algorithms may thus be trained and retrained via machine learning to determine how a particular user prefers to hold the computing device and what the user expectation is in that particular case. Model 807 may provide a continuous refinement path to synchronize with what a particular user would like the computing device to behave.

For example, posture engine 840 may receive user feedback in the form of corrective signals 850, indicating to change the active touch display. Posture engine 840 may then adjust which of the first and second display devices is active. Device preferences 833 may be updated based on the user feedback. Future active display probabilities may be adjusted via model 807 based on the updated device preferences.

Computing device 800 may be coupled to one or more cloud computing devices 860. Cloud computing device 860 may be used to store user profiles 862 and model parameters 864 for a plurality of users. User profile 830 and/or model 807 may be periodically stored in at cloud computing device 860 and may follow the user if the user moves from one computing device to another one. If the new computing device is not identical to the original computing device where model 807 was trained, additional retraining may be necessary to correct for differences. Corrective signals and other retraining inputs may also be sent to the cloud, and in some examples, may retrain model 807 at cloud computing device 860. The retraining may be based on user profiles 862 and model parameters 864 received for multiple users. A retrained version of model 807 may then be downloaded for use at decision engine 805.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
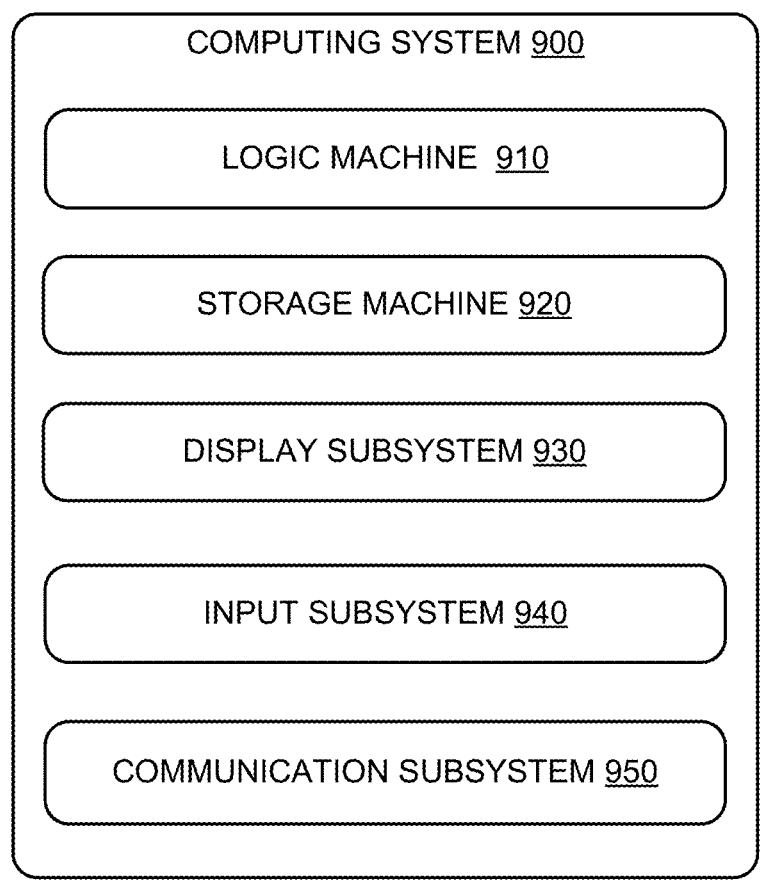
FIG. 9 shows an example computing system according to an embodiment of the present disclosure.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, input subsystem 940, communication subsystem 950, and/or other components not shown in FIG. 9.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 910 executing instructions held by storage machine 920. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 930 may be used to present a visual representation of data held by storage machine 920. This visual representation may take the form of a graphical user interface (GUI). As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, input subsystem 940 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 950 may be configured to communicatively couple computing system 900 with one or more other computing devices. Communication subsystem 950 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In one example, a computing device comprises a first leaf including a first touch display; a second leaf, a hinge rotatably coupling the first leaf and the second leaf, a hinge angle sensor to measure a hinge angle between the first leaf and the second leaf; an inertial measurement unit (IMU) to measure an orientation of one or both of the first leaf and the second leaf, and a storage machine holding instructions executable by a logic machine to: receive a first touch heat map from the first touch display; receive the hinge angle from the hinge angle sensor; receive the orientation from the IMU; based at least on the received first touch heat map, hinge angle, and orientation, generate a posture probability indicating a likelihood that the first touch display is in a candidate display posture; based at least on the received first touch heat map, hinge angle, and orientation, generate an active probability indicating a likelihood that the first touch display is an active display; and adjust one or more display characteristics of the first touch display based on the posture probability and the active probability. In such an example, or any other example, the display characteristics additionally or alternatively include an orientation of content displayed by the first touch display. In any of the preceding examples, or any other example, the display characteristics additionally or alternatively include display positions of display objects on the first touch display. In any of the preceding examples, or any other example, the display characteristics additionally or alternatively include positions of user input zones on the first touch display. In any of the preceding examples, or any other example, the display characteristics additionally or alternatively include an on/off state of the first touch display. In any of the preceding examples, or any other example, the storage machine additionally or alternatively holds instructions executable by the logic machine to: determine a display-usage gesture based at least on the received hinge angle and orientation, and wherein generating the active probability is additionally or alternatively based on the determined display-usage gesture. In any of the preceding examples, or any other example, the determined display-usage gesture is additionally or alternatively a flip gesture wherein the computing device is in a substantially back-to-back pose, and wherein the computing device is rotated so that an orientation of the first and second leaves is switched relative to gravity. In any of the preceding examples, or any other example, the determined display-usage gesture is additionally or alternatively a fold gesture, wherein a device pose is adjusted from a flat or folded pose to a back-to-back pose. In any of the preceding examples, or any other example, the active probability and the posture probability are additionally or alternatively based on a stored user parameter indicating a handedness of the user.

In any of the preceding examples, or any other example, the second leaf additionally or alternatively includes a second touch display, and wherein the storage machine additionally or alternatively holds instructions executable by a logic machine to: receive a second touch heat map from the second touch display; generate the posture probability based further at least on the second touch heat map; and generate the active probability based further at least on the second touch heat map. In any of the preceding examples, or any other example, the active probability and the posture probability are additionally or alternatively based on device preferences. In any of the preceding examples, or any other example, the storage machine additionally or alternatively holds instructions executable by the logic machine to: receive user feedback indicating to change the active touch display; adjust which of the first touch display and second touch display is active; update the device preferences based on the user feedback; and adjust how future active display probabilities are generated based on the updated device preferences. In any of the preceding examples, or any other example, the storage machine additionally or alternatively holds instructions executable by the logic machine to: adjust performance characteristics of the logic machine based on the active probability and the posture probability. In any of the preceding examples, or any other example, the storage machine additionally or alternatively holds instructions executable by the logic machine to: adjust thermal performance characteristics of the computing device based on the first touch heat map, the active probability, and the posture probability.

In another example, a computing device comprises a first leaf including a display; a second leaf; and a hinge rotatably coupling the first leaf and the second leaf; at least one processor; and a posture engine configured to: based at least on a relative posture of the first leaf and the second leaf, adjust performance characteristics of the processor. In such an example, or any other example, the display included in the first leaf is additionally or alternatively a first touch display configured to output a first touch heat map, the second leaf additionally or alternatively includes a second touch display configured to output a second touch heat map, and wherein the posture engine is additionally or alternatively further configured to: adjust performance characteristics of the processor based on the first and second touch heat maps. In any of the preceding examples, or any other example, the posture engine is additionally or alternatively configured to: based at least on the first and second touch heat maps for the first and second touch displays, adjust thermal performance characteristics of the processor. In any of the preceding examples, or any other example, adjusting thermal performance characteristics of the processor additionally or alternatively includes adjusting a position of one or more heat dissipation zones. In any of the preceding examples, or any other example, the posture engine is additionally or alternatively configured to: receive one or more posture probabilities indicating a likelihood that each touch display is in one of a plurality of display postures, the posture probabilities based on at least the first and second touch heat maps, a handedness model for a user, and a heat map history for the user.

In yet another example, a method for a hinged, multi-screen display comprises receiving a first touch heat map from a first touch display; receiving a second touch heat map from a second touch display rotatably coupled to the first touch display via a hinge; receiving a hinge angle indicative of an angle between the first touch display and the second touch display; receiving an orientation of one or more of the first touch display and the second touch display; based at least on the received first touch heat map, second touch heat map, hinge angle, and orientation, generating a posture probability indicating a likelihood that each of the first touch display and second touch display is in a candidate display posture; based at least on the received first touch heat map, second touch heat map, hinge angle, and orientation, generating active probabilities indicating a likelihood that each of the first touch display and the second touch display is an active touch display; and adjusting one or more display characteristics of the first and second touch displays based on the posture probability and the active probabilities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a first leaf including a first touch display;
a second leaf;
a hinge rotatably coupling the first leaf and the second leaf; and
a storage machine holding instructions executable by a logic machine to:
receive a first touch map from the first touch display;
based at least on the received first touch map, generate a posture probability indicating a likelihood that the first touch display is in a candidate display posture including a device orientation relative to gravity and a device orientation relative to a user; and
adjust one or more display characteristics of the first touch display based at least on the posture probability.

2. The computing device of claim 1, wherein the storage machine further holds instructions executable by the logic machine to:
based at least on the received first touch map, generate an active probability indicating a likelihood that the first touch display is an active display, wherein the one or more display characteristics of the first touch display is adjusted based at least on the posture probability and the active probability.

3. The computing device of claim 2, wherein the storage machine further holds instructions executable by the logic machine to:
receive a hinge angle from a hinge angle sensor, wherein the posture probability is generated based at least on the received first touch map and the received hinge angle, and wherein the active probability is generated based at least on the received first touch map and the received hinge angle.

4. The computing device of claim 3, wherein the storage machine further holds instructions executable by the logic machine to:
receive an orientation of one or both of the first leaf and the second leaf from an inertial measurement unit (IMU), wherein the posture probability is generated based at least on the received first touch map, the received hinge angle, and the received orientation, and wherein the active probability is generated based at least on the received first touch map, the received hinge angle, and the received orientation.

5. The computing device of claim 1, wherein the display characteristics include one or more of an orientation of content displayed by the first touch display, display positions of display objects on the first touch display, positions of user input zones on the first touch display, or an on/off state of the first touch display.

6. The computing device of claim 4, wherein the storage machine further holds instructions executable by the logic machine to:
determine a display-usage gesture based at least on the received hinge angle and orientation, and wherein generating the active probability is further based at least on the determined display-usage gesture.

7. The computing device of claim 6, wherein the determined display-usage gesture is a flip gesture wherein the computing device is in a substantially back-to-back pose, and wherein the computing device is rotated so that the orientation of the first and second leaves is switched relative to gravity.

8. The computing device of claim 6, wherein the determined display- usage gesture is a fold gesture, wherein a device pose is adjusted from a flat or folded pose to a back-to-back pose.

9. The computing device of claim 2, wherein the active probability and the posture probability are further based at least on a stored user parameter indicating a handedness of the user.

10. The computing device of claim 2, wherein the second leaf includes a second touch display, and wherein the storage machine further holds instructions executable by a logic machine to;
receive a second touch map from the second touch display;
generate the posture probability based further at least on the second touch map; and
generate the active probability based further at least on the second touch map.

11. The computing device of claim 10, wherein the active probability and the posture probability are further based at least on device preferences.

12. The computing device of claim 11, wherein the storage machine further holds instructions executable by the logic machine to:
receive user feedback indicating to change the active touch display;
adjust which of the first touch display and second touch display is active;
update the device preferences based at least on the user feedback; and
adjust how future active display probabilities are generated based at least on the updated device preferences.

13. The computing device of claim 2, wherein the storage machine further holds instructions executable by the logic machine to:
adjust performance characteristics of the logic machine based at least on the active probability and the posture probability.

14. The computing device of claim 13, wherein the storage machine further holds instructions executable by the logic machine to:
adjust thermal performance characteristics of the computing device based at least on the first touch map, the active probability, and the posture probability.

15. A computing device, comprising:
a first leaf including a first touch display configured to output a first touch map;
a second leaf; and
a hinge rotatably coupling the first leaf and the second leaf;
a processor; and a posture engine configured to:
  based at least on the first touch map and based at least on a posture probability indicating that the processor is in a candidate display posture including a device orientation relative to gravity and a device orientation relative to a user, adjust performance characteristics of the processor while maintaining the processor active.

16. The computing device of claim 15, wherein the second leaf includes a second touch display configured to output a second touch map, the second touch map indicating capacitance values for a plurality of touch sensing locations of the second touch display and wherein the posture engine is further configured to:
  adjust performance characteristics of the processor based at least on the second touch map.

17. The computing device of claim 15, wherein the performance characteristics are adjusted further based on at least a relative posture of the first leaf and the second leaf and a position of the processor within the computing device.

18. The computing device of claim 17, wherein the posture engine is further configured to:
  based at least on the first and second touch maps for the first and second touch displays, adjust thermal performance characteristics of the processor, wherein adjusting thermal performance characteristics of the processor includes adjusting a position of one or more heat dissipation zones.

19. The computing device of claim 16, wherein
the posture probability further indicates a likelihood that each touch display is in one of a plurality of display postures, wherein the posture probability is based at least on the first and second touch maps, a handedness model for a user, and a touch map history for the user.

20. A method for a hinged, multi-screen display, comprising:
  receiving a first touch map from a first touch display, the first touch map indicating capacitance values for a plurality of touch sensing locations of the first touch display;
  receiving a second touch map from a second touch display rotatably coupled to the first touch display via a hinge, the second touch map indicating capacitance values for a plurality of touch sensing locations of the second touch display;
  receiving a hinge angle indicative of an angle between the first touch display and the second touch display;
  receiving an orientation of one or more of the first touch display and the second touch display;
  based at least on the received first touch map, second touch map, hinge angle, and orientation, generating a posture probability indicating a likelihood that each of the first touch display and second touch display is in a candidate display posture including a device orientation relative to gravity and a device orientation relative to a user;
  based at least on the received first touch map, second touch map, hinge angle, and orientation, generating active probabilities indicating a likelihood that each of the first touch display and the second touch display is an active touch display; and
  adjusting one or more display characteristics of the first and second touch displays based at least on the posture probability and the active probabilities.

* * * * *